(12) United States Patent
Selfin et al.

(10) Patent No.: US 8,806,165 B2
(45) Date of Patent: Aug. 12, 2014

(54) MASS-STORAGE SYSTEM UTILIZING AUXILIARY SOLID-STATE STORAGE SUBSYSTEM

(75) Inventors: Moshe Selfin, Haifa (IL); Daniel Golan, Aloney Abba (IL); Yedidia Atzmony, Omer (IL)

(73) Assignee: Kaminario Technologies Ltd., Yokne'Am Ilit (IL)

( * ) Notice: Subject to any disclaimer, the term of this patent is extended or adjusted under 35 U.S.C. 154(b) by 447 days.

(21) Appl. No.: 13/263,003

(22) PCT Filed: Oct. 27, 2009

(86) PCT No.: PCT/IL2009/001004
§ 371 (c)(1),
(2), (4) Date: Oct. 5, 2011

(87) PCT Pub. No.: WO2010/116349
PCT Pub. Date: Oct. 14, 2010

(65) Prior Publication Data
US 2012/0030415 A1    Feb. 2, 2012

Related U.S. Application Data

(60) Provisional application No. 61/168,346, filed on Apr. 10, 2009.

(51) Int. Cl.
*G06F 12/00* (2006.01)
*G06F 11/20* (2006.01)
*G06F 3/06* (2006.01)
*G06F 11/14* (2006.01)

(52) U.S. Cl.
CPC .......... *G06F 3/0647* (2013.01); *G06F 11/2074* (2013.01); *G06F 11/2015* (2013.01); *G06F 3/0685* (2013.01); *G06F 3/0631* (2013.01); *G06F 3/068* (2013.01); *G06F 11/1441* (2013.01); *G06F 11/2087* (2013.01); *G06F 3/061* (2013.01)
USPC ........................... 711/163; 711/103; 711/154

(58) Field of Classification Search
USPC ........................................ 711/103, 154, 165
See application file for complete search history.

(56) References Cited

U.S. PATENT DOCUMENTS 5,392,244 A    2/1995  Jacobson et al.
6,181,630 B1   1/2001  Caulkins
(Continued)

FOREIGN PATENT DOCUMENTS

GB          2437102 A      10/2007

OTHER PUBLICATIONS

International Search Report and Written Opinion dated Jan. 28, 2010 in corresponding International Application No. PCT/IL2009/001004.

*Primary Examiner* — Reba I Elmore
(74) *Attorney, Agent, or Firm* — Wiggin and Dana LLP; Gregory S. Rosenblatt

(57) ABSTRACT

A mass storage system including main and auxiliary storage subsystems and a controller Main storage provides physical storage space and includes non-solid-state storage devices ("NSSDs") NSSDs provide physical locations, and main storage includes physical storage locations provided by NSSDs Controller is coupled to main storage and may be configured for mapping logical addresses to physical locations, giving rise to a logical storage space The auxiliary subsystem includes a solid-state data retention device ("SSDRD") capable of permanently storing data and provides a physical location, giving rise to auxiliary space Controller is coupled to the auxiliary subsystem and may override a mapping of logical addresses to physical locations, with a mapping of logical address to physical locations within the auxiliary space, overriding physical storage locations Controller is adapted for loading a snapshot of the data currently stored in the overridden physical storage locations.

30 Claims, 5 Drawing Sheets

(56) References Cited

U.S. PATENT DOCUMENTS

| | | |
|---|---|---|
| 6,473,355 B2 | 10/2002 | Caulkins |
| 6,538,669 B1 | 3/2003 | Lagueux, Jr. et al. |
| 6,553,408 B1 | 4/2003 | Merrell et al. |
| 6,640,278 B1 | 10/2003 | Nolan et al. |
| 6,643,209 B2 | 11/2003 | Caulkins |
| 7,225,308 B2 | 5/2007 | Melament et al. |
| 7,254,668 B1 * | 8/2007 | Chang et al. .................. 711/103 |
| 2008/0154993 A1 | 6/2008 | Rathi et al. |
| 2008/0183953 A1 | 7/2008 | Flynn et al. |
| 2008/0301256 A1 | 12/2008 | McWilliams et al. |

* cited by examiner

MASS-STORAGE SYSTEM UTILIZING AUXILIARY SOLID-STATE STORAGE SUBSYSTEM

CROSS REFERENCE TO RELATED APPLICATIONS

This application claims the benefit of U.S. Provisional Application Ser. No. 61/193,079, entitled "A Mass-Storage System Utilizing Volatile Memory Storage and Non-Volatile Storage" filed Oct. 27, 2008, and further claims the benefit of U.S. Provisional Application Ser. No. 61/168,346, entitled "A Mass-Storage System Utilizing Auxiliary Solid-State Storage Subsystem" filed Apr. 10, 2009, both of which are hereby incorporated herein by reference in its entirety.

FIELD OF THE INVENTION

The present invention is in the field of mass storage systems.

LIST OF REFERENCES

The following references are considered to be pertinent for the purpose of understanding the background of the present invention:
U.S. Pat. No. 6,473,355 to Caulkins.
U.S. Pat. No. 6,643,209 to Caulkins.
United Kingdom Patent Application Publication No. GB2437102 to An-Sheng Chang et al.
U.S. Pat. No. 6,181,630 to Caulkins.

BACKGROUND OF THE INVENTION

U.S. Pat. No. 7,225,308 to Melament, et al discloses an inexpensive storage system and methods of managing such a system. In one preferred embodiment, the system includes a high performance high reliability storage medium configured for initial storage of data, a low performance high reliability storage medium configured for backup of data initially stored on the high performance high reliability storage medium, and a high performance low reliability storage medium, configured to receive data transferred from the high performance high reliability storage medium, after the data has been backed up on the low performance high reliability storage medium. This significantly reduces the cost of the system without substantially comprising performance. Reliability is likewise maintained owing to the high reliability backup.

U.S. Pat. No. 5,392,244 to Jacobson, et al. discloses a storage system which comprises a disk array having a plurality of disks, a disk array controller for coordinating data transfer to and from the disks, and a RAID management system for mapping two different RAID areas onto the disks. The RAID management system stores data in one of the RAID areas according to mirror redundancy, and stores data in the other RAID area according to parity redundancy. The RAID management system then shifts or migrates data between the mirror and parity RAID areas on the disks in accordance with a predefined performance protocol, such as data access recency or access frequency.

US Patent Application Publication No. 20080154993 to Unmesh et al. discloses a multiple QoS file system and methods of processing files at different QoS according to rules. The invention allocates multiple VLUNs at different qualities of service to the multiQoS file system. Using the rules, the file system chooses an initial QoS for a file when created. Thereafter, the file system moves files to different QoS using rules. Users of the file system see a single unified space of files, while administrators place files on storage with the new cost and performance according to attributes of the files. A multi-QoS file system enhances the descriptive information for each file to contain the chosen QoS for the file.

US Patent Application Publication No. 20010018728 to Topham et al. discloses a RAID-device with a pair of non-volatile solid state data storage devices and one or more rotating disk drives, giving improved access time performance to the array. Data is staged on the pair of solid state data storage devices, and periodically backed up to the rotating disk drive(s). Topham et al. suggests using Dynamic Random Access Memory (DRAM) arrays as an alternative to the solid state data storage devices. DRAM devices are intrinsically volatile, and lose their stored data when power is removed. In order to make a non-volatile solid state data storage device, Topham et al. suggest a combination of an array of DRAM devices, and a battery power supply in a casing. Topham et al. asserts that although DRAMs provide better performance in terms of read and write access times than a comparable MRAM unit, there is the disadvantage of the need to provide a battery back-up to overcome the intrinsic volatility of DRAM devices to provide a non-volatile DRAM data storage unit.

SUMMARY OF THE INVENTION

There is provided according to some embodiments of the invention a mass storage system. According to some embodiments of the invention, the mass storage system may include: a main storage subsystem, an auxiliary storage subsystem and a controller. The main storage subsystem may provide a main physical storage space of the mass storage system and may include a plurality of non-solid-state storage devices ("NSSDs"). The plurality of NSSDs may provide a plurality of physical storage locations and the main storage space may include the plurality of physical storage locations provided by the plurality of NSSDs. The storage system controller may be coupled to the main storage subsystem and may be configured for mapping a plurality of logical storage addresses to a respective plurality of physical storage locations within the main storage space, giving rise to a logical storage space. The auxiliary storage subsystem may include a plurality of solid-state data retention devices ("SSDRDs") capable of substantially permanently storing data thereon. The plurality SSDRDs may provide a plurality of physical storage locations collectively giving rise to an auxiliary storage space. The storage system controller is coupled to the auxiliary storage subsystem and is responsive to a first condition for overriding a mapping of a plurality of logical addresses to a respective plurality of physical storage locations within the main storage subsystem with a mapping of the plurality of logical storage address to a respective plurality of physical storage locations within the auxiliary storage space, giving rise to overriding and overridden physical storage locations. The storage system controller is further adapted for loading into the overriding physical storage locations a snapshot of the data currently stored in the overridden physical storage locations. The storage system controller is further responsive to a second condition, for loading a snapshot of the data currently stored in the overriding physical storage locations into the overridden physical storage locations, and for reinstating the mapping of the logical storage area to the overridden physical storage locations.

According to further embodiments, the mapping of the plurality of logical storage addresses to a respective plurality of physical storage locations within the main storage subsystem is maintained while the mapping is overridden. In still further embodiments, while the mapping of the plurality of logical storage addresses to a respective plurality of physical storage locations within the main storage subsystem is overridden, the storage system controller is configured to access the overridden physical storage locations within the main storage subsystem in connection with an I/O request that is associated with a logical storage address among the plurality of logical storage addresses whose mapping is overridden. In yet further embodiments, while the mapping of a logical storage address to one or more physical storage locations within the main storage space is overridden, the storage system controller is configured to update the respective overridden storage location(s) in the main storage space according to changes in the data stored within the respective overriding physical storage location(s) in the auxiliary storage space.

In some embodiments, the updates of the overridden physical storage location(s) in the main storage space are asynchronous with the changes in the data stored within the respective overriding physical storage location(s) in the auxiliary storage space. In further embodiments, the auxiliary storage subsystem is capable of significantly higher performance compared to main storage subsystem.

In some embodiments, the storage system controller may manage a queue of logical storage addresses for which there are pending updates of overridden physical storage locations. In further embodiments, the storage system controller is responsive to a state of the queue for adjusting an operation of the mass storage system which is related to the state of the queue. In still further embodiments, the storage system controller is responsive to a state of the queue for slowing down or temporarily freezing servicing of I/O requests. In yet further embodiments, the storage system controller is further responsive to a limit parameter of a component of the mass storage system that is related to the state of the queue for adjusting an operation of the mass storage system which is related to the state of the queue. In still further embodiments, the component of the mass storage system whose limit parameter is related to the state of the queue is an uninterrupted power supply unit.

In some embodiments, there is a temporal relation between the first and the second condition. In further embodiments, in accordance with the temporal relation, the mapping reinstation with respect to a logical storage address is initiated within a limited and predefined period of time from the initiation of the mapping override with respect to the logical storage address.

In some embodiments, the relation between the first condition and the second condition is associated with a predefined performance parameter. In further embodiments, in accordance with the first condition, the mapping override is initiated when a performance indicator associated with plurality of logical storage addresses meets a first performance related criterion, and wherein in accordance with the second condition, the mapping reinstation is initiated when a performance indicator associated with the plurality logical storage addresses whose mapping was overridden meets a second performance related criterion.

In some embodiments, the storage system controller is adapted to allocate the logical storage space based on a plurality of physical storage locations provided by the plurality of NSSDs. In further embodiments, the storage system controller is configured to ignore the plurality of physical storage locations within the auxiliary storage space when allocating the logical storage space.

In some embodiments, the plurality of NSSDs in the main storage subsystem are selected from a group consisting of hard disk drive, hybrid hard drive, holographic data storage, tape drive, optical disk, Compact Disk, Digital Versatile Disc, Bluray disc and floppy Disk, micro-electro-mechanical-system ("MEMS") based storage unit.

In some embodiments, one or more of the plurality of SSDRDs comprises one or more volatile data retention units. In further embodiments, the plurality of SSDRDs in the auxiliary storage subsystem are selected from a group consisting of: DRAM based SSD, NAND based Flash SSD including MLC or SLC versions random-access memory ("RAM"), dynamic random-access memory ("DRAM"), static random-access memory ("SRAM"), Extended Data Out DRAM ("EDO DRAM") and Fast Page Mode DRAM.

According to some embodiments, the storage system controller may include a main storage space table, an auxiliary storage space table and a logical storage space table. The main storage space table may include an entry for each physical storage location in the main storage space. The auxiliary storage space table may include an entry for each physical storage location in the auxiliary storage space. The logical storage space table may include an entry for each logical storage address in the main storage space, and may include for each logical storage address entry a record of one or more physical storage locations in the main storage space which are allocated to that logical storage address. In further embodiments, the logical storage space table may further include, at least for each logical storage address whose mapping to the respective one or more physical storage locations in the main storage space is currently overridden, a mapping override flag which indicates the override of the mapping of the corresponding logical storage address. In still further embodiments, the logical storage space table may further include, at least for each logical storage address whose mapping to the respective one or more physical storage locations in the main storage space is currently overridden, a record of one or more overriding physical storage location in the auxiliary storage space.

In some embodiments, the size of the auxiliary storage space corresponds to a portion of the main storage space.

In some embodiments, the main storage subsystem comprises an intermediate storage controller. The intermediate storage controller is operatively coupled to the plurality of NSSDs and is adapted to allocate a plurality of virtual physical storage locations, each one of the plurality of virtual physical storage locations corresponding to one or more physical storage locations provided by the plurality of NSSDs. The intermediate storage controller is operatively connected to the storage system controller and is adapted to provision the plurality of virtual physical storage locations to the storage system controller. In further embodiments, the storage system controller is configured to manage a virtual storage address substantially as if it where a physical storage address. In still further embodiments, the storage system controller is adapted to direct an I/O request referencing a virtual storage address to the intermediate storage controller associated with that virtual storage address.

In some embodiments, the storage system controller is adapted to implement the mapping override operation on one of a plurality of predefined groups of logical storage addresses.

According to a further aspect of the invention, there is provided a mass storage system, comprising: a main storage subsystem, an auxiliary storage subsystem and a storage system controller. The main storage subsystem providing a main physical storage space of the mass storage system. The main storage subsystem includes a plurality of NSSDs, and the plurality of NSSDs provide a plurality of physical storage locations. The main storage space may include the plurality of physical storage locations provided by the plurality of NSSDs. The storage system controller is coupled to the main storage subsystem and is configured for mapping a plurality of logical storage addresses to a respective plurality of physical storage locations within the main storage space, giving rise to a logical storage space. The auxiliary storage subsystem includes a plurality of SSDRDs. The plurality of SSDRDs are capable of substantially permanently storing data thereon. The plurality SSDRDs may provide a plurality of physical storage locations collectively giving rise to an auxiliary storage space. The storage system controller is coupled to the auxiliary storage subsystem and is responsive to a first condition for overriding a mapping of a logical storage area within the logical storage space to a plurality of physical storage locations within the main storage subsystem with a mapping of the logical storage area to a plurality of physical storage locations within the auxiliary storage space, giving rise to overriding and overridden physical storage locations. The storage controller is further configured for loading into the overriding physical storage locations a snapshot of the data currently stored in the overridden physical storage locations. The storage controller is further responsive to a second condition, for loading a snapshot of the data currently stored in the overriding physical storage locations into the overridden physical storage locations, and for reinstating the mapping of the logical storage area to the overridden physical storage locations.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
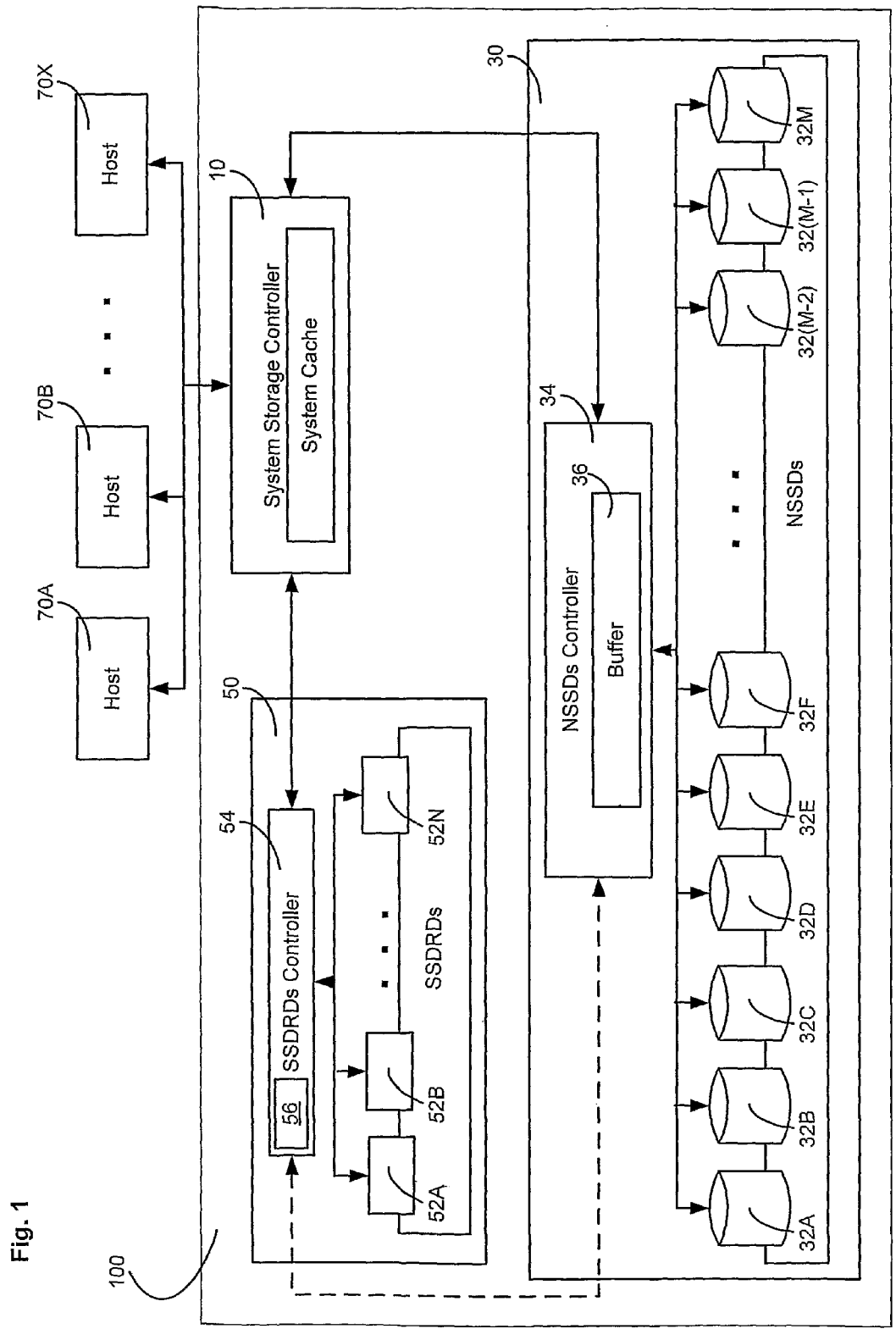
FIG. 1 is a block diagram illustration of a mass-storage system including an auxiliary storage subsystem, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Unless specifically stated otherwise, as apparent from the following discussions, it is appreciated that throughout the specification discussions utilizing terms such as "processing", "computing", "calculating", "determining", "mapping", "assigning", "allocating", "designating", "mapping", "overriding", "reinstating", "snapshot", "updating", "provisioning" or the like, refer to the action and/or processes of a computer that manipulate and/or transform data into other data, said data represented as physical, e.g. such as electronic, quantities. The term "computer" should be expansively construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC, etc.) and other electronic computing devices.

The operations in accordance with the teachings herein may be performed by a computer specially constructed for the desired purposes or by a general purpose computer specially configured for the desired purpose by a computer program stored in a computer readable storage medium.

In addition, embodiments of the present invention are not described with reference to any particular programming language. It will be appreciated that a variety of programming languages may be used to implement the teachings of the invention as described herein.

Throughout the description of the present invention, reference is made to the term "non-solid-state storage devices" and to the abbreviation "NSSDs". Unless specifically stated otherwise, the terms "non-solid-state storage devices", "NSSDs" and the like shall be used to describe a component which includes one or more data retention modules which utilize some moving mechanical components in its operation. Non-limiting examples of non-solid-state storage devices include: hard disk drive, hybrid hard drive, holographic data storage, tape drive, optical disk, Compact Disk, Digital Versatile Disc, Bluray disc, floppy Disk, micro-electro-mechanical-system ("MEMS") based storage unit.

Throughout the description of the present invention, reference is made to the term "solid-state data retention devices" or to the abbreviation "SSDRDs". Unless specifically stated otherwise, the terms "solid-state data retention devices", "SSDRDs" and the like shall be used to describe a component or a collection of components that include one or more solid-state data retention units, which independently or in cooperation with other components, is/are capable of persistently storing data thereon. For clarity, it would be appreciated that in some embodiments of the present invention, a SSDRD may include one or more non-volatile data retention units and/or one or more volatile data retention units.

A variety of non-volatile solid state data retention devices would be known to those versed in the art. Non-volatile solid state data-retention devices are inherently capable of persistently storing data thereon. An SSDRD may comprise a non-volatile solid state data retention device, and the nonvolatile solid state data retention device may be used to persistently store data in the SSDRD. Non-limiting examples of non-volatile solid-state storage devices include: DRAM based SSD, NAND based Flash SSD (either MLC or SLC).

As mentioned above, in accordance with some embodiments of the present invention, a SSDRD may comprise a volatile data retention unit. The ability of a volatile data retention unit to retain data is sensitive to power failure and/or power degradation. It is therefore common to regard volatile data retention units as "memory units" and not as "storage units". However, in co-pending U.S. Provisional Application Ser. No. 61/193,079 and in the corresponding PCT application concurrently filed with the present application and assigned to a common assignee, both of which are incorporated by reference in their entirety into the present disclosure, there is disclosed a storage system which includes volatile data-retention units that are used for persistently storing data thereon. The storage system disclosed in U.S. Provisional Application Ser. No. 61/193,079 and in the corresponding PCT application concurrently filed with the present application and assigned to a common assignee includes a primary storage space, a temporary backup storage space, a permanent backup storage space, a storage controller and one or more uninterrupted power supply (UPS) units.

The primary storage space is associated with a plurality of volatile storage ("VS") devices and is used for persistently storing the entire data-set of the storage system. The temporary backup storage space is also associated with a plurality of VS devices. The permanent backup storage space is associated with nonvolatile storage ("NVS") devices. The controller is responsive to a write request related to a data element being received at the storage system for implementing a provisional redundant storage sequence including: storing the data element within the primary storage space and substantially immediately or concurrently storing recovery-enabling-data corresponding to the data-element within the temporary backup storage space. The controller is configured to acknowledge the write request substantially immediately following completion of the storage within the primary storage space and within the temporary backup storage space, and the provisional redundant storage sequence is thus complete. The one or more UPS units are configured to provide backup power to extend data-retention on some or all of the VS devices in case of power interruption. Asynchronously with the provisional redundant storage sequence, the controller is configured to destage the recovery-enabling-data to the permanent backup storage space.

The controller of the proposed storage system may be configured to manage the asynchronous destaging of the recovery enabling data in accordance with a predefined permanent backup deferral policy which takes into account at least one parameter that is independent of the provisional redundant storage sequence of the respective data element. The deferral policy may provide a controlled timeframe for deferring the asynchronous destaging of the recovery enabling data relative to the storage system's response to the respective write request (the storage system response may be any one of the operations which are part of the provisional redundant storage sequence). The deferral policy may take into account the capacity of the UPS units. The deferral policy may further take into account the availability of storage resource within the temporary backup storage space. The deferral policy may take into account at least one other process running within the storage system and competing for resources with the data destaging process.

During normal operation (not power interruption) the UPS units are configured to provide backup power for at least the time-duration required for completing the destaging of data from the substantially temporary backup space (which is based on VS devices) to the substantially permanent backup storage layer (which is based on NVS devices), so that the entire data-set of the storage system is backed up on NVS devices before the storage system can gracefully shutdown.

Further as part of the proposed storage system, the controller may be responsive to an indication that the recovery-enabling-data was successfully destaged to the permanent backup storage space for releasing the temporary backup storage space resources that were used for storing the corresponding recovery-enabling-data. Once released, the storage resources of the temporary backup storage space can be used for storing other data, such as recovery-enabling-data corresponding to a data element that is associated with a more recent write command.

The storage capacity of the temporary backup storage space is substantially smaller than the storage capacity of the primary storage space. The storage capacity of the permanent backup storage space is substantially equal to (or larger than) the storage capacity of the primary storage space. At any time during the operation of the proposed storage system, the data stored within the primary storage space is protected by corresponding recovery-enabling-data that is stored within the temporary backup storage space or within the permanent backup storage space. During normal operation (not power interruption), a relatively small portion of the data within the primary storage space is protected by data within the temporary backup storage space, and the permanent backup storage space protects at least the remaining data which is not protected by the data within the temporary backup storage space.

As is well known, and as was mentioned above, the ability of a volatile data-retention unit to retain data is sensitive to main power interruption. It is therefore common to regard volatile data retention devices as "memory devices" and not as "storage devices". However, it would be apparent to those versed in the art that within the storage system proposed in U.S. Provisional Application Ser. No. 61/193,079 and in the corresponding PCT application concurrently filed with the present application and assigned to a common assignee, and described above, utilizes the primary storage space which is associated with volatile data-retention devices (or "volatile storage devices") in combination with other components and logic for substantially persistently storing data therein. Specifically, the proposed storage system further includes: two complementary backup storage spaces: a temporary backup storage layer (or space) which is also associated with VS devices; and a permanent backup storage layer which is associated with NVS devices, a storage controller and one or more UPS units for providing backup power to enable full backup in case of power interruption and graceful shut-down, and a recovery controller for recovering the data into the primary storage space following data loss within the primary storage space.

The VS devices associated with the primary storage space are regarded herein as storage devices, despite their inherent volatility, since the logical storage addresses that are used by the storage system for servicing I/O requests from external sources are associated with physical storage locations on VS devices, and this configuration is restored in case of power interruption before normal operation of the storage system is resumed. It would be appreciated that this sort of behavior is characteristic of storage devices.

During normal operation of the storage system, I/O requests from external sources (which typically reference logical storage addresses) are mapped to physical storage locations allocated for the primary storage space by the VS devices associated with the primary storage space. In case of failure within the primary storage space, the entire data-set is protected, as explained above, and can be recovered from the permanent backup storage layer or from the temporary backup storage layer. In case of severe power interruption, the entire data set of the storage system is stored within the NVS devices underlying the permanent backup storage layer, and once normal power is restored the data that was lost is recovered into the primary storage space and normal I/O operations are resumed vis-à-vis the VS devices associated with the primary storage space.

From a user's (host) perspective, the data protection and the data availability capabilities of the proposed storage system are similar to the protection and availability provided by many commercially available non-volatile storage systems, such as hard-drive disk ("HDD") based storage system (including various RAID implementations), or in another example, such as non-volatile solid-state disk ("SSD") flash based storage systems. For example, when a read command is received at the proposed storage system, say from a host, the storage system controller reads the logical storage address referenced by the read command and determines the corresponding physical storage location(s) associated with the referenced logical storage address. The physical storage location(s) point towards specific locations within one or more of the first plurality of VS devices associated with the primary storage space. The storage system controller reads the data stored on the VS device(s) at the physical storage location(s) determined to be associated with the read command and communicates the data back to the host.

According to a further aspect of the storage system disclosed in U.S. Provisional Application Ser. No. 61/193,079 and in the corresponding PCT application concurrently filed with the present application and assigned to a common assignee, there is provided a storage system comprising one or more non-volatile storage units, a controller and one or more UPS units. A first volatile data retention unit, possibly in cooperation with the controller, is responsive to a write command related to a data element for storing a first copy of the data element. A second volatile data retention unit, possibly in cooperation with the controller, is responsive to the write command related to the data element for temporarily storing recovery-enabling data corresponding to the respective data element. The write command is acknowledged when a copy is stored within the first volatile data retention unit and corresponding recovery-enabling data is stored within the second volatile data retention unit. The writing of data to the first and second volatile data retention units and the acknowledgment of the write command are commonly referred to herein as the "provisional redundant storage sequence". In response to the provisional redundant storage sequence a write command to the nonvolatile data retention unit may be initiated. The write command to the nonvolatile data retention unit may be subject to a predefined permanent backup deferral policy. The deferral policy may be effective for deferring the issuance of the write command to the nonvolatile data retention unit until some predefined destaging criterion is met. Once according to the deferral policy the write command to the nonvolatile storage module is issued, the corresponding recovery-enabling data is stored therein. The system includes UPS units which are configured to provide backup power in a sufficient amount to allow full backup of the entire data-set of the storage system within nonvolatile data retention units before the system gracefully shuts down. Also included in accordance with some embodiments of the proposed system is a recovery controller that is adapted to recover lost data, for example as a result of severe power interruption, so that when normal operation of the system is resumed users can access the data on the volatile data retention units underlying the primary storage space.

In some embodiments, the system disclosed in U.S. Provisional Application Ser. No. 61/193,079 and in the corresponding PCT application concurrently filed with the present application and assigned to a common assignee, which are incorporated by reference in their entirety into the present disclosure may be used in some embodiments of the present invention as a SSDRD.

It would be appreciated that an SSDRD which uses VS devices for storing data, as is proposed above, may provide substantially high-performance in read operations and in write operations. Non-limiting examples of VS modules include: random-access memory (RAM), dynamic random-access memory (DRAM), static random-access memory (SRAM), Extended Data Out DRAM (EDO DRAM), Fast Page Mode DRAM.

In further embodiments, a modified implementation of the storage system disclosed in U.S. Provisional Application Ser. No. 61/193,079 and in the corresponding PCT application concurrently filed with the present application may be used as a SSDRD wherein the VS devices associated with the primary storage space and/or the VS devices associated with the temporary backup storage space are replaced with a nonvolatile solid-state data retention devices such as a Flash storage unit. Some of the aspects of the system disclosed in U.S. Provisional Application Ser. No. 61/193,079 and in the corresponding PCT application concurrently filed with the present application and assigned to a common assignee may be implemented mutatis-mutandis in a SSDRD wherein VS devices associated with the primary storage space and/or the VS devices associated with the temporary backup storage space are replaced with a nonvolatile solid-state data retention devices, such as a Flash storage unit.

Turning now to FIG. 1, there is shown a block diagram illustration of a mass-storage system including an auxiliary storage subsystem, in accordance with some embodiments of the invention. In some embodiments of the invention, a mass storage system 100 may include a storage system controller 10, a main storage subsystem 30 and an auxiliary storage subsystem 50. The mass storage system 100 may be operatively connected to one or more hosts 70A-70X and may provide storage services to the hosts 70A-70X. In one embodiment, the mass storage system 100 is an enterprise grade storage system connected to and servicing a plurality of hosts 70A-70X.

The main storage subsystem 30 provides a main storage space of the mass storage system 100. The auxiliary storage subsystem 50 provides an auxiliary storage space of the mass storage system 100. The storage system controller 10 is coupled to the main storage subsystem 30 and is configured for mapping a plurality of physical storage locations allocated to the main storage space to a respective plurality of logical storage addresses. The physical storage locations are provided by the storage devices underlying the main storage space. The logical storage addresses are provisioned to the hosts 70A-70X associated with the storage system 100 and can be used by the hosts 70A-70X for writing data into the storage system 100 or for reading data therefrom. Those with ordinary skill in the art may appreciate that other I/O operations are also possible and may be implemented in a manner known per se.

The storage system controller 10 may support various provisioning methods and may allocate the logical storage space according to any such provisioning method and based on the physical storage locations provided by the main storage space.

The auxiliary storage space is auxiliary in the sense that the physical storage locations associated with the auxiliary storage space are not allocated excluded from the logical storage space allocation and are thus not available for the hosts 70A-70X to store data therein. In some embodiments, the physical storage resources provided by the auxiliary storage subsystem 50 do not expand the storage capacity of the mass storage system 100, at least during certain periods or states of the operation of the mass storage system 100.

Figure 2:
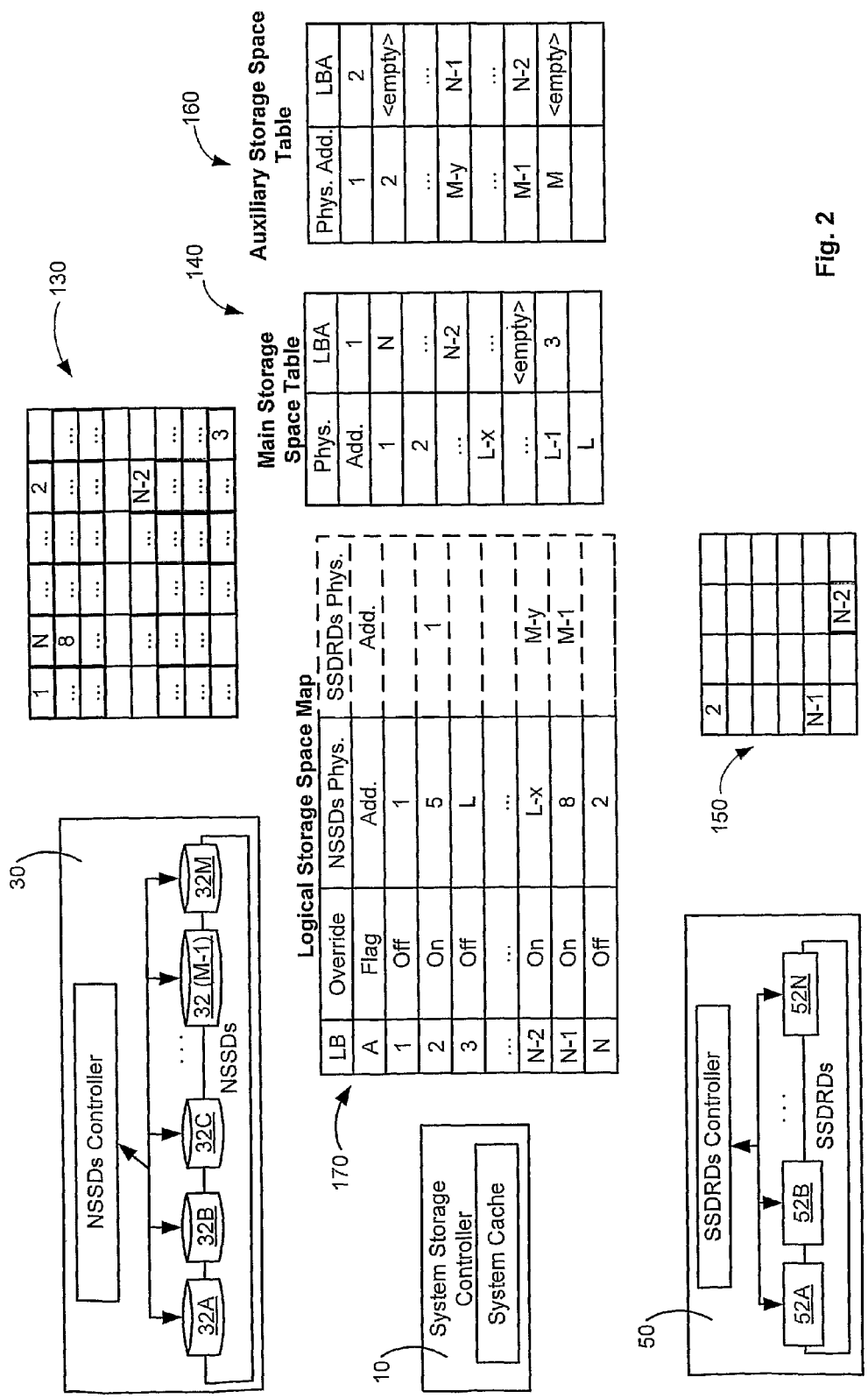
FIG. 2 is a graphical illustration of some of the components of the mass storage system and of various storage spaces and storage space tables which may be utilized by the mass storage system, as part of some embodiments of the invention.

The main storage subsystem 30 may include a plurality of non-solid-state storage devices ("NSSDs") 32A-32M. Reference is now additionally made to FIG. 2, which is a graphical illustration of some of the components of the mass storage system and of various storage spaces and storage space tables which may be utilized by the mass storage system, as part of some embodiments of the invention. As is shown in FIG. 2, the plurality of NSSDs 32A-32M provide a plurality of physical storage locations 130. As is also shown in FIG. 2, and in accordance with some embodiments, the storage system controller 10, which is operatively connected to the main storage subsystem 30, establishes a main storage space of the mass storage system 100. The storage system controller 10 is configured to establish the main storage space of the mass storage system 100 based on the plurality of physical locations provided by the main storage subsystem 30. With reference to FIG. 2, the main storage space includes the plurality of physical storage locations 130 provided by the plurality of NSSDs 32A-32M. The storage system controller 10 may maintain a representation of the main storage space 140. In FIG. 2, and according to some embodiments, the storage system controller 10 maintains a main storage space table 140 in which all the physical storage locations allocated by the main storage subsystem 30 are recorded; however any other suitable data structure or representation may be used.

The auxiliary storage subsystem 50 may include a plurality of solid-state data retention devices ("SSDRDs") 52A-52N. The plurality of SSDRDs 52A-52N provide a plurality of physical storage locations 150. In accordance with some embodiments, the storage system controller 10 is operatively connected to the auxiliary storage subsystem 50, and is configured to establish an auxiliary storage space of the mass storage system 100 based on the plurality of physical storage locations allocated by the auxiliary storage subsystem 50. With reference to FIG. 2, the auxiliary storage space includes the plurality of physical storage locations 150 allocated by the plurality of SSDRDs 52A-52N. The storage system controller 10 may maintain a representation of the auxiliary storage space 160. In FIG. 2, and according to some embodiments, the storage system controller 10 maintains an auxiliary storage space table 160 in which all the physical storage locations provided by the auxiliary storage subsystem 50 are recorded. In some embodiments, the size of the auxiliary storage space corresponds to a portion of the main storage space 130.

Throughout the description of the present invention reference is made to the term "physical storage location" or "physical storage locations" in the plural. The term "physical storage location" is known in the art and the following definition is provided for convenience purposes. Accordingly, unless stated otherwise, the definition below shall not be binding and this term should be construed in accordance with their usual and acceptable meaning in the art. "Physical storage location" is the representation that is used within a storage system to designate discrete or atomic hardware resources or locations where data can be stored. For example, on a VS unit, a physical storage location may be each cell of the unit, which is typically capable of storing 1 bit of data (although a technology known as "multi-level cell" or "MLC" in abbreviation enables storage of multiple bits on each cell). In a further example, each physical storage location may be associated with a chunk of multiple hardware cells which cannot be individually allocated for storage. Further by way of example, a physical storage location may defined by to a specific hardware addressing scheme or protocol used by a computer storage system to address I/O requests referencing logical storage addresses to explicit hardware physical storage locations, and each physical storage location may correspond to one more cells of the storage unit and to one or more bits or bytes. Further by way of example, a physical storage address may be a SCSI based physical storage address.

In some embodiments, what appears to the storage system controller 10 as a physical storage location may actually be a virtual storage location. A virtual storage location may be allocated by an intermediate storage controller connected in between the storage system controller 10 and one or more physical storage devices of the mass storage system 100 (NSSDs and/or SSDRDs). More details about various embodiments of the invention wherein an intermediate storage controller is implemented as part of the mass storage system 100 are now provided.

It would be appreciated by those versed in the art that the organization of the functional components of the proposed mass storage system 100, including the main storage subsystem 30, the auxiliary storage subsystem 50 and the storage system controller 10, may take on many forms. For example, each of the main storage subsystem 30, the auxiliary storage subsystem 50 and the storage system controller 10 may be distributed and operated as a virtual entity. Furthermore, components of the main storage subsystem 30, and of the auxiliary storage subsystem 50 may be implemented on a common hardware platform.

In some embodiments, an intermediate storage controller may be implemented as part of the mass storage system 100 and may provide a layer of abstraction between the storage system controller 10 and the physical storage devices (NSSDs and/or SSDRDs). The intermediate storage controller may be adapted to allocate a plurality of virtual storage locations. Each of the plurality of virtual storage locations may correspond to one or more physical storage locations on the one or more physical storage devices with which the intermediate storage controller is associated. The virtual storage locations provided by the intermediate storage controller may emulate physical storage locations.

In some embodiments there could be a plurality of intermediate storage controllers implemented in between the storage system controller 10 and the physical storage devices and emulating as many layers of abstraction. In some embodiments, the protocol between the layers may be the same protocol. In other embodiments, the protocols on either side of an abstraction layer may be different, and the intermediate storage controller providing the abstraction layer may be adapted to translate from one protocol to the other.

There is now provided an example of an operation scenario involving an intermediate storage controller. In this scenario, the intermediate storage controller is connected to four storage devices, each of size 100 Giga Byte. The intermediate storage controller implements a RAID-5 configuration over the four storage devices, each of size 100 Giga Byte. The result is a virtual storage space of size 300 Giga Byte. The intermediate storage controller generates or designates virtual storage locations over the virtual storage space and provisions the virtual storage locations to the storage system controller 10. In this example, the virtual storage space including the virtual storage addresses is represented to the storage system controller 10 as a single logical device using the SCSI storage protocol. Further in accordance with this example, the storage system controller 10 interfaces with a plurality of hosts 70A-70X using the Fiber Channel ("FC") protocol, and provisions to the hosts 70A-70X a collection of logical storage addresses which are associated with as a single storage entity of size 300 Giga Bytes, where in fact, the physical storage is comprised of four storage devices each of size 100 Giga Byte in a RAID-5 configuration using an iSCSI protocol.

In such a case, the storage system controller 10 receives an external I/O request referencing, using FC protocol a certain logical storage address which is associated with one or more locations in the virtual storage space. The storage system controller 10 maps the logical addresses to what it perceives as the physical storage address, and what is actually a virtual physical storage address provisioned by the intermediate storage controller. The storage system controller 10 addresses the I/O request according to the virtual physical storage address. Since this virtual physical storage address is within the domain of the intermediate storage controller, the I/O request from the storage system controller 10 is received at the intermediate storage controller. The intermediate storage controller determines which one or more actual physical storage addresses are allocated for the virtual physical storage address associated with the I/O request from the storage system controller 10.

In this example, the intermediate storage controller determines the physical storage locations in the RAID-5 group which correspond to the virtual physical storage address referenced by the storage system controller 10, and accordingly issues one or more I/O commands to the physical storage location(s) using iSCSI protocol. In a READ request this would require also collecting the data received from the physical storage location(s) and retransmitting it according to FC protocol to the storage system controller 10 and from there to the requesting host. In a WRITE request, in addition to storing the new or updated data in the appropriate physical storage location, the intermediate storage controller is adapted to update (at least) a parity value in a physical storage location other than the storage location where the new or updated data is stored. In a WRITE request, the intermediate storage controller may acknowledge servicing the request via an iSCSI ACK message, and the storage system controller 10 upon receiving the iSCSI ACK may communicate a corresponding FC ACK to the respective host.

The intermediate storage controller may provision the virtual storage locations to the storage system controller 10. In some embodiments, the virtualization process implemented by the intermediate storage controller may be transparent to the storage system controller 10. A virtual storage location provisioned by the intermediate storage controller to the storage system controller 10 may be regarded and processed by the storage system controller 10 in the same manner as any other physical storage location. Accordingly, in some embodiments, the storage system controller 10 may establish the main and/or the auxiliary storage spaces of the mass storage system 100 based on virtual storage locations, physical locations and any combination thereof. In some embodiments, when a certain I/O request is determined to be related to a certain virtual storage address, the storage system controller 10 handles the request as any other request which references a physical address, and may direct the I/O request according to the virtual storage address. In some embodiments, an I/O request which is related to a certain virtual storage address may be forwarded to the respective intermediate storage controller (e.g. the intermediate controller associated with the virtual storage address), and the intermediate storage controller may map the virtual storage address to one or more physical storage locations which are associated with the referenced virtual storage address.

In one example, an intermediate storage controller may implement a RAID 1 storage scheme over a plurality of NSSDs in the main array 30. Accordingly, the intermediate controller may map a single virtual storage address into two different physical storage locations. It would be appreciated that in this case of RAID 1, the intermediate storage controller may be adapted to use the address of one of the mirrored physical storage locations. The virtual storage address may be otherwise related to the address of one or more of the physical storage locations allocated to it. In some embodiments, when the storage system controller 10 issues a write request which relates to a virtual storage address that is within the domain of a certain intermediate storage controller implementing a RAID 1 storage scheme, the intermediate storage controller may write the data associated with the write request into two distinct physical storage locations which are allocated to the virtual storage address.

By way of example, the main and/or the auxiliary storage subsystems 30 and 50 may include one or more subsystem storage controllers, generally referred to herein as NSSDs controller 34 and SSDRDs controller 54, respectively. The subsystem storage controllers 34 and 54 may be adapted to control some or all of the NSSDs 32A-32M or SSDRDs 52A-52N, respectively. The NSSDs controller 34 and/or the SSDRDs controller 54 may add a layer of abstraction between the storage system controller 10 and the physical storage devices (namely, the respective NSSDs/SSDRDs). As is shown in FIG. 1, for example, the subsystem storage controller 34 and 54 may include a buffer 36 and 56, respectively.

As mentioned above, the storage controller 10 is configured for mapping a plurality of logical storage addresses to a respective plurality of physical storage locations (or to virtual storage locations) within the main storage space 130. In FIG. 2, and according to some embodiments, the storage controller 10 maintains a logical storage space table 170 in which all the logical storage addresses provisioned by the storage controller 10 are recorded. In some embodiments, the logical storage space table 170 includes the mapping of the logical storage addresses to physical storage locations (or to virtual storage locations). With reference to each logical storage address, the table 170 provides the one or more physical storage addresses allocated for that logical storage address. In further embodiments, the logical storage space table 170 may include further data, as will be discussed in greater detail below. In other embodiments, the mapping of the logical storage space to physical storage locations may be implemented using a mapping function. A mapping function is operative for receiving a logical storage address and returning the respective physical storage address (or addresses) and vice versa. Those versed in the art would be familiar with the use and the implementation of various mapping functions.

The logical storage space generated by the storage controller 10 essentially comprises a plurality of addressable logical storage addresses which are mapped by the storage controller 10 to a plurality of respective physical storage locations. The logical storage addresses in the logical storage space may be contiguous, and each one logical storage address may be allocated to one or a predefined number of physical storage locations in the main storage space.

In the description provided herein, the main storage subsystem 30 comprises a plurality of NSSDs 32A-32M and auxiliary storage subsystem 30 comprises a plurality of SSDRDs 52A-52N. It would be appreciated that as part of some embodiments of the present invention, a main storage subsystem 30 may possibly include some solid state data retention devices or subsystems (SSDRDs) in addition to the plurality of NSSDs 32A-32M. In such implementations, each one of the SSDRDs in the main storage subsystem 10 is characterized by being capable of providing substantially persistent storage of its entire data set, at any time and in particular irrespective of power loss or power failure conditions. In such systems, the physical storage locations provided by the SSDRDs that are part of the main storage subsystem 30 and the physical storage locations provided by the NSSDs 32A-32M may become part of a combined main storage space. In addition, the physical storage locations provided by the SSDRDs that are part of the main storage subsystem 30 and the physical storage locations provided by the NSSDs 32A-32M may also be mapped into a respective plurality of logical storage addresses. In such implementations, the logical storage addresses associated with the physical storage locations provided by the SSDRDs and the logical storage addresses associated with the physical storage locations provided by the NSSDs 32A-32M in the main storage subsystem 30 may give rise to a combined logical storage space which may be provisioned to the hosts 70A-70X.

Some embodiments of the present invention may be applicable to such combined logical storage space, and the storage controller 10 may be essentially indifferent to the type of underlying storage device (NSSD or SSDRDs) which provides the physical storage locations that are associated with any logical storage address in the logical storage space.

In other embodiments, the invention relates only to the portion(s) of such combined storage space which comprises logical storage addresses that are associated with physical storage locations provided by a NSSD. In such embodiments, the storage controller 10 is aware of the type of storage device (NSSD or SSDRDs) that is associated with a certain logical storage address (for example, a certain area(s) within the logical storage space may be exclusively associated with logical storage addresses that are provided by NSSDs). Further as part of such embodiments, any reference made herein to a logical storage space in general, relates to the portion of the combined storage space which comprises logical storage addresses that are associated with physical storage locations provided by a NSSD.

Figure 3:
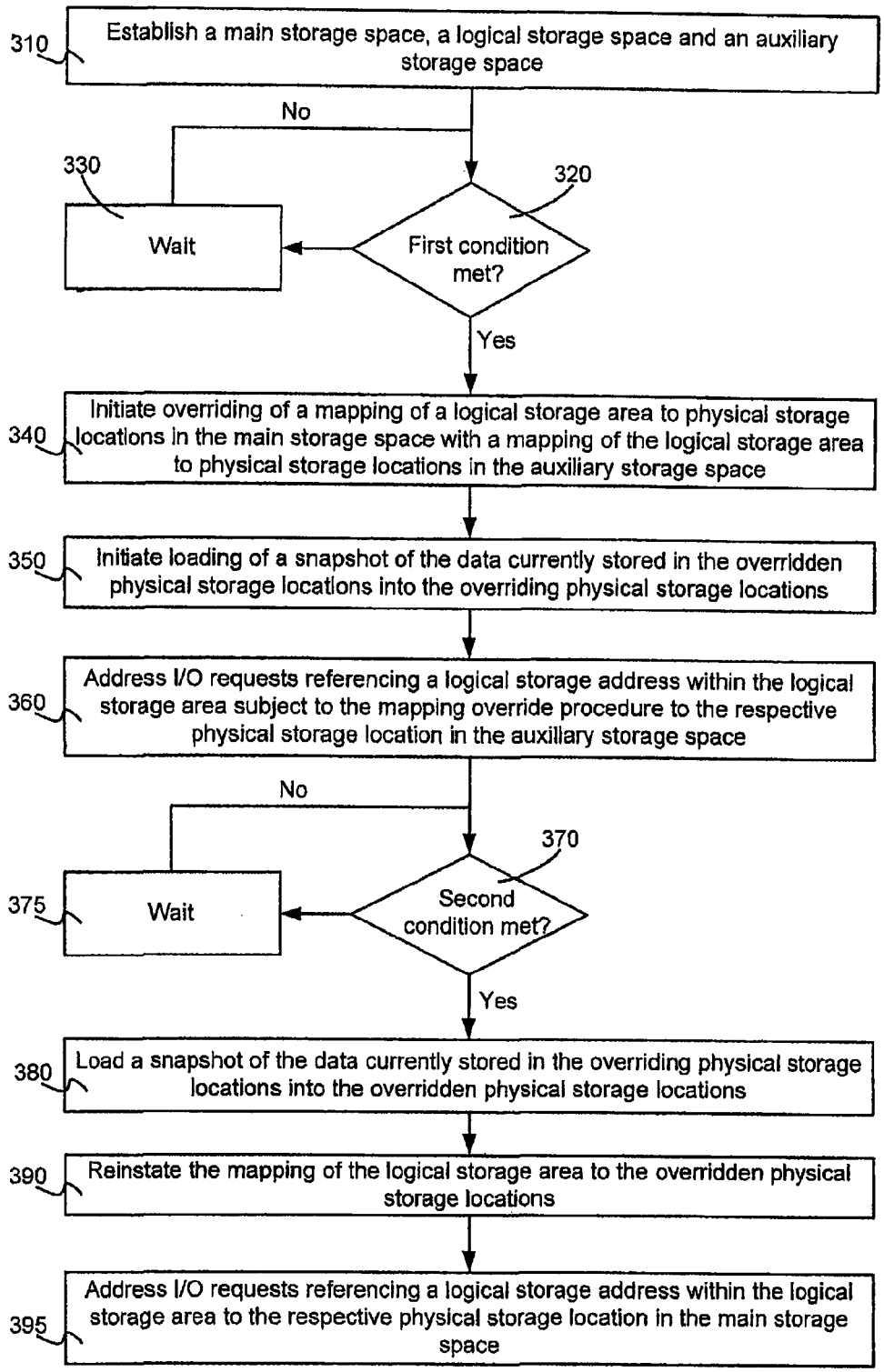
FIG. 3 is a flowchart illustration of a method of managing a mass storage system in accordance with some embodiments of the present invention.

Having provided some details about the storage controller 10, the main storage subsystem 30, the auxiliary storage subsystem 50, and about the main storage space, the auxiliary storage space and the logical storage space, there is now provided a description of a process of managing a mass storage system 100 in accordance with the present invention. Reference is now additionally made to FIG. 3, which is a flowchart illustration of a method of managing a mass storage system in accordance with some embodiments of the present invention. Initially, the storage controller 10 establishes each of the following: a main storage space, a logical storage space and an auxiliary storage space, essentially as was described above (block 310). At some point during the operation of the mass storage system 100, the storage controller 10 may detect or may receive an indication that a first condition is met. In FIG. 3, and in accordance with some embodiments, the storage controller 10 periodically checks for circumstances which meet the first condition (blocks 320 and 330). In some embodiments, the first condition may be predefined. The first condition is also referred to herein as the dynamic mapping override condition. More details about the dynamic mapping override condition shall be provided below.

According to some embodiments, in response to detecting that the dynamic mapping override condition is met, the storage controller 10 may be adapted to override a mapping of a plurality of logical storage addresses to physical storage locations in the main storage space 130 with a mapping of the logical storage addresses to physical storage locations in the auxiliary storage space (block 340). For convenience, the physical storage locations in the main storage space associated with the mapping override are collectively referred to herein as the overridden physical storage locations, and the physical storage locations in the auxiliary storage space that are associated with the mapping override are collectively referred to herein as overriding physical storage locations. The storage controller 10 may also be responsive to the first condition being met, for initiating loading of the data currently stored in the overridden physical storage locations into the overriding physical storage locations (block 350). The loading of the data currently stored in the overridden physical storage locations into the overriding physical storage locations, and the loading of the data from the overriding physical storage locations into the overridden physical storage locations into the overriding physical storage locations, is sometimes to referred to herein as "snapshot". The term "snapshot" is known in the art and the above definition is provided for convenience purposes. Accordingly, unless stated otherwise, the definition above shall not be binding and this term should be construed in accordance with its usual and acceptable meaning in the art.

In a further embodiment, the mapping override operation (block 340) and the snapshot operation (block 350) may be initiated by a manual instruction received (through some interface) from an administrator of the mass storage system 100.

In some embodiments, the plurality of logical storage addresses that are subject to the mapping override operation are part of a predefined group of logical storage addresses. The footprint of such a predefined group of logical storage addresses within the logical storage space is sometimes referred to herein as a "logical storage area", and these terms are used interchangeably. According to some embodiments, each group of logical storage addresses which may be subject to the mapping override operation is characterized by a common characteristic or property and/or is manually predefined by an administrator of the mass storage system 100. It would be appreciated that in some embodiments, an instance of the mapping override operation and the snapshot operation (blocks 340 and 350) may be implemented on a plurality of logical storage areas.

In some embodiments, as part of the mapping override procedure, an override indication may be in connection with each one of the plurality of logical storage addresses whose mapping to the physical storage location(s) in the main storage space is currently overridden. In addition or as an alternative, an override indication may be provided in connection with each one of the overridden physical storage locations, indicating that the mapping of the respective logical storage address into this physical storage location is currently overridden. By way of example, in FIG. 2, and according to some embodiments, each logical storage address entry in the logical storage space table 170 includes an override flag record. The override flag may be used to provide an indication that the mapping of a certain logical storage address to a certain physical storage location(s) in the main storage space is currently overridden. For example, when the flag is turned on, the indication flag indicates that the respective logical storage address is currently overridden. In FIG. 2, the entry for blocks (logical storage addresses) 2, N−2 and N−1 includes a record for an override flag that is indicated as being turned on. Accordingly, the logical storage space table 170 indicates that blocks 2, N−2 and N−1 are currently overridden.

As mentioned above, override mapping operations may be implemented on one (or more) of a plurality of predefined groups of logical storage addresses (logical storage area). In some embodiments, as part of an override operation, the override indication may be provided with respect to the group of logical storage addresses that are about to be overridden.

The indication may collectively relate to each one of the logical storage addresses in the group. Thus, in some embodiments, whenever an I/O request is received, the storage controller 10 may check whether the logical storage address referenced by I/O request is within the logical storage area whose mapping is currently overridden, and if it is, the storage controller 10 may proceed to determine the overriding physical storage address associated with the referenced logical storage address.

In some embodiments, further as part of the mapping override procedure, an indication with respect to the overriding physical storage location(s) may be provided in connection with each one of the overridden physical storage locations and/or in connection with each one of the plurality of storage addresses whose mapping to physical storage location(s) in the main storage space is currently overridden. By way of example, in FIG. 2, and according to some embodiments, each logical storage address entry in the logical storage space table 170, whose mapping to physical storage location(s) in the main storage space is currently overridden, includes an entry for a physical storage location(s) in the auxiliary storage space. This entry designates the mapping of the respective logical storage address to a specified physical storage address in the auxiliary storage space 160 which currently overrides the mapping of the logical storage address to the physical storage address(es) in the main storage space 170. In FIG. 2, blocks (logical storage addresses) 2, N−2 and N−1 are indicated as overridden (the respective override flag is turned on), and for each one of these blocks there is an entry with a physical storage location within the auxiliary storage space 150.

As mentioned above, within the mass storage system 100 intermediate storage controllers may be used to map virtual storage locations to physical storage locations and to provision the virtual storage locations to the system storage controller 10. As was also mentioned above, the system storage controller 10 may relate to the virtual storage locations as physical storage locations. Thus, in some embodiments, the mapping of a logical storage address to a virtual storage location which corresponds to physical storage location(s) in the main storage subsystem 30 may be overridden with a mapping of the logical storage address to a physical storage location(s) in the auxiliary storage subsystem 50. Similarly, in some embodiments, the mapping of a logical storage address to a physical storage location(s) in the main storage subsystem 30 may be overridden with a mapping of the logical storage address to virtual storage location(s) which corresponds to physical storage location(s) in the auxiliary storage subsystem 50. Still further in some embodiments, the mapping of a logical storage address to a virtual storage location which corresponds to physical storage location(s) in the main storage subsystem 30 may be overridden with a mapping of the logical storage address to virtual storage location(s) which corresponds to physical storage location(s) in the auxiliary storage subsystem 50.

For instance, in accordance with one example, an intermediate storage controller may implement a RAID 5 protection scheme over physical storage devices within the main storage subsystem 30. The intermediate storage controller may allocate a plurality of virtual storage addresses for the plurality of physical storage locations provided by the physical storage devices within the main storage subsystem 30. The system storage controller 10 may regard the virtual storage locations as physical storage locations and map each logical storage address to one or more virtual storage locations. Further in accordance with this example, an intermediate storage controller may implement a RAID 1 protection scheme over physical storage devices within the auxiliary storage subsystem 50. The intermediate storage controller may allocate a plurality of virtual storage addresses for the plurality of physical storage locations provided by the physical storage devices within the auxiliary storage subsystem 50. The system storage controller 10 may regard the virtual storage locations as physical storage locations and map each logical storage address to one or more virtual storage locations. Thus, in one scenario, as part of a mapping override operation, the mapping of a certain logical storage address to a virtual storage location which corresponds to physical storage locations within the main storage space may be overridden with a mapping of the logical storage address to a virtual storage location which corresponds to physical storage locations within the auxiliary storage space.

It would be appreciated that the various tables shown in FIG. 2 are just one example of a data structure which may be utilized by the storage controller and other components of the proposed mass storage system, including for the purpose of indicating that a mapping of a certain logical storage address to physical storage location(s) in the main storage space is currently overridden and/or to designate or indicate a physical storage address in the auxiliary storage space whose mapping to certain logical storage addresses overrides the mapping of the logical storage address to a physical storage address in the main storage space. Furthermore, some of the data structures may be implemented outside the storage controller 10. In another embodiment, one or more mapping functions may be used instead of tables. For example, a mapping function may be provided which maps overridden physical storage locations into overriding physical storage locations.

Continuing with the description of the flow chart shown in FIG. 2, according to some embodiments, following overriding the mapping of the logical storage addresses to physical storage locations in the main storage space and the mapping of the logical storage addresses to physical storage locations in the auxiliary storage space (block 340), and following the completion of the snapshot (block 350), the storage controller 10 may address I/O requests which reference or that are addressed to a logical storage address that was subject to the mapping override procedure to the respective physical storage location in the auxiliary storage space (block 360). In some embodiments, the auxiliary storage subsystem 50 provides substantially higher performance in read operations, in write operations or in both read and write operations compared to the main storage subsystem 30. Thus, the mapping override procedure may boost the performance of an area of the logical storage space of the mass storage system 100. This aspect of the invention is described in further detail below.

In some embodiments, upon initiation of the mapping override operation with respect to a certain area of the logical storage area (block 340), the storage controller 10 may temporarily suspend servicing of I/O requests that are associated with a logical storage address that is within the logical storage area whose mapping is about to be or is currently being overridden. In some embodiments, the storage controller 10 may temporarily suspend servicing of I/O requests that are associated with any one of the plurality of logical storage addresses that are within the logical storage area whose mapping is about to be or is currently being overridden. The storage controller 10 may suspend the I/O service for this area of the logical storage space until the mapping of the overriding physical storage locations and the snapshot operation (blocks 340 and 350) are complete for each one of the plurality of logical storage addresses in the logical storage area associated with the override.

In further embodiments, the storage controller 10 is configured to continue servicing I/O requests that are associated with any one of the plurality of logical storage addresses within the logical storage area associated with the override. The storage controller 10 may determine, for example, using the logical storage space table 170, the current mapping of a logical storage address and in case the logical storage address is overridden, the storage controller 10 may direct the I/O to the overriding physical storage location(s) and not wait for the completion of the override operation in its entirety. Furthermore, in some embodiments, as long as the mapping override for a certain logical storage address is not complete, the storage controller 10 may direct an I/O request that is associated with the logical block address to the respective physical storage address within the main storage system 30. In such cases, if the data is modified as a result of servicing such I/O requests, the updated data is copied to the respective overriding physical storage locations.

According to some embodiments, whenever a new I/O request is received at the mass storage system 100, an indication of the I/O request is received at the storage controller 10. Upon receiving such indication, the storage controller 10 may be configured to extract from the I/O request information with respect to the logical storage address(es) that the I/O request is provided as input to the storage controller 10. Once the storage controller 10 determines to which logical storage address(es) the I/O request is addressed, the storage controller 10 is configured to determine based on the data in the logical storage space table 170 with which physical storage locations the I/O request is associated. The storage controller 10 may also be adapted to determine, based on the logical storage address(es) with which the I/O request is associated and based on the information in the logical storage table 170, whether the mapping of any of the logical storage address(es) with which the I/O request is associated has been overridden. In case the storage controller 10 determines that the mapping of a logical storage address from among the logical storage address(es) with which the I/O request is associated is not (currently) overridden, the storage controller 10 resumes the servicing of the I/O request vis-à-vis (or with) the respective physical storage locations in the main storage space 130. However, in case the storage controller 10 determines that the mapping of a logical storage address from among the logical storage address(es) with which the I/O request is associated is (currently) overridden, the storage controller 10 obtains information about the overriding physical storage location(s) within the auxiliary storage space 150, and the storage controller services the I/O request vis-à-vis (or with) the overriding physical storage location(s).

In some embodiments, the mapping of a logical storage address to one or more physical storage locations in the storage space 130 is maintained while this mapping is overridden by a mapping of the logical storage address to one or more physical storage locations in the auxiliary storage space 150. During the time that a mapping of a certain logical address to physical storage location(s) in the main storage space 130 is overridden the storage controller 10 may access this data and may use it. For example, while incoming I/O requests which are associated with a certain logical storage address are serviced vis-à-vis overriding physical storage location(s) in the auxiliary storage space 150, the respective overridden storage location(s) in the main storage space 130 may be updated from time to time according to changes in the data stored within the respective overriding physical storage locations. It would be appreciated, that according to some embodiments of the invention, the updates to the overridden storage location(s) in the main storage space 130 are typically not synchronous (or asynchronous) with the servicing of the I/O requests by the overriding storage location(s) in the auxiliary storage space 150. In some embodiments, the auxiliary storage subsystem 50 is capable of significantly higher performance compared to the main storage subsystem 30. Thus, when the throughput associated with data modifying I/O requests exceeds a certain threshold, back-to-back updating of the changes on the overridden physical storage location(s) may be operationally unfeasible.

Some examples of rules which may be implemented by the storage controller 10 to determine if and when to update the data in a certain overridden storage location(s) in response to a change in the data stored within the respective overriding physical storage locations, are now provided. In one example, the storage controller 10 may maintain and manage a queue of logical storage addresses whose mapping is overridden and in respect of which a certain data update was implemented on the respective physical locations within the auxiliary storage space. The storage controller 10 may implement a routine whereby for the logical storage address at the top of the queue, the storage controller 10 implements the data update on the respective physical storage addresses within the main storage space. In some embodiments, the routine which involves implementing data updates on the corresponding (overridden) physical storage addresses within the main storage space which are associated with the respective overridden logical storage address gives rise to an asynchronous update scheme. The data update with respect to a certain logical storage address is thus asynchronous on the respective overriding and overridden physical storage locations.

In further embodiments, the storage controller 10 may manage the queue of logical storage addresses for which there are pending updates of overridden physical storage locations according to various criteria and/or thresholds. In still further embodiments, under certain conditions, the storage controller 10 may adjust one or more operations of the mass storage system 100 or of any of its components in accordance with the state of the queue of logical storage addresses for which there are pending updates of overridden physical storage locations. For example, when the queue is full or when there is more than a certain number of logical storage addresses for which there are pending updates in the queue, the storage controller 10 may slow-down or completely freeze servicing of I/O requests. In some embodiments the storage controller may reaccelerate or resume operations of the mass storage system 100 or of any of its components when circumstances change, for example, when the number of logical storage addresses for which there are pending updates in the queue falls below a certain threshold.

Further by way of example, in a system such as that which is disclosed in U.S. Provisional Application Ser. No. 61/193, 079 and in the corresponding PCT application concurrently filed with the present application and assigned to a common assignee, the storage controller 10 may be sensitive to the state of the queue of logical storage addresses for which there are pending updates of overridden physical storage locations when servicing incoming I/O requests which are associated with overridden logical storage addresses. For example, in some embodiments, the storage controller 10 may slow-down or suspend the servicing of incoming I/O requests which are associated with logical storage addresses whose mapping is currently overridden, in case some measure related to the logical storage addresses in the queue crosses a certain threshold or meets a certain criterion. In one embodiment, the criterion or threshold is related to the capacity of the uninterrupted power supply ("UPS") systems that are used with the volatile data retention devices in the auxiliary storage subsystem 50.

Figure 5:
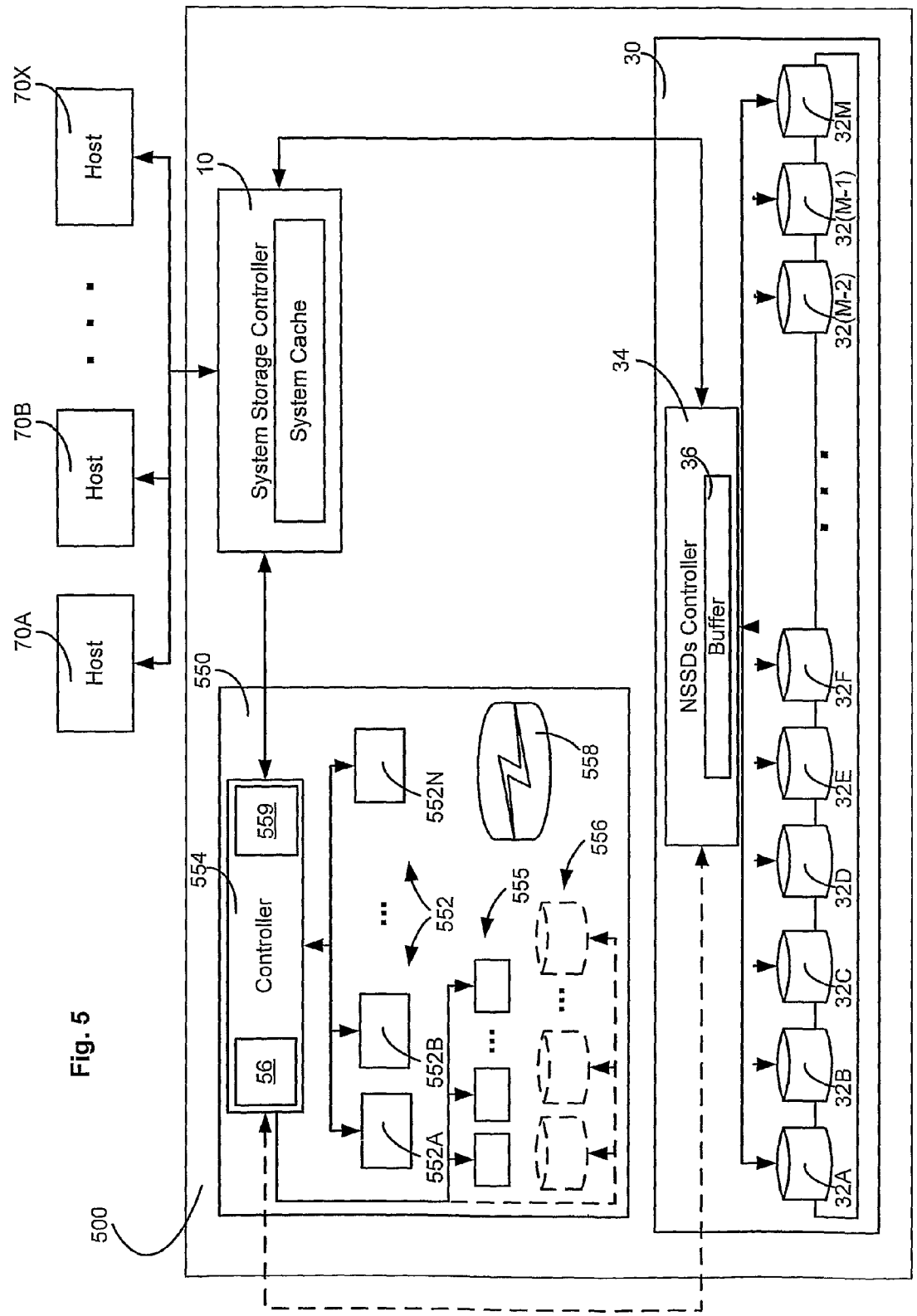
FIG. 5 is a block diagram illustration of a mass storage system according to some embodiments of the invention, wherein the physical storage addresses allocated for the auxiliary storage space are provided by an array of volatile storage devices.

In some embodiments, and as briefly mentioned above, the SSDRDs 52A-52N associated with the auxiliary storage space may be volatile data-retention units. Reference is now made to FIG. 5, which is a block diagram illustration of a mass storage system according to some embodiments of the invention, wherein the physical storage addresses allocated for the auxiliary storage space are provided by an array of volatile storage devices. As was mentioned above, the physical storage addresses allocated for the auxiliary storage space are provided by an array of volatile storage devices 552A-552N. The volatile storage devices 552A-552N are used in combination with other components and logic for substantially persistently storing data therein.

Specifically, the proposed auxiliary storage system 500 further includes: two complementary backup storage spaces: a temporary backup storage layer (or space) which is also associated with VS devices 555; and a permanent backup storage layer which is associated with NVS devices 556, a storage controller 554 and one or more UPS units 558 for providing backup power to enable full backup in case of power interruption and shut-down, and a recovery controller 559 for recovering the data into the primary storage space following data loss within the primary storage space.

While a certain logical storage area is overridden, the logical storage addresses within the overridden area are mapped to physical storage locations on the VS devices 552A-552N associated with primary storage space of the auxiliary storage space. The data within the VS devices 552A-552N is protected at all times, and in particular against a power interruption event which may cause the data within the VS devices 552A-552N to be lost. While data loss within the VS devices 552A-552N as a result of power interruption is possible, the subsystem 550 is configured so that the lost is always protected and can be fully recovered. Throughout the operation of the auxiliary storage space, the mapping of the logical storage addresses within the overridden area to physical storage locations on the VS devices 552A-552N associated with primary storage space of the auxiliary storage space is maintained, so when recovering from data loss within the primary storage space of the auxiliary storage space, normal operation is resumed only after the relevant data is restored into VS devices 552A-552N associated with primary storage space of the auxiliary storage space. It would be appreciated that this sort of behavior is characteristic of storage devices.

The storage subsystem 550 shown in FIG. 5, which underlies the auxiliary storage space was described in detail in U.S. Provisional Application Ser. No. 61/193,079 and in the corresponding PCT application concurrently filed with the present application and assigned to a common assignee. There are now provided some details related to the components of the proposed storage subsystem 550 and regarding the operation thereof.

The controller auxiliary storage space controller 554 is responsive to a write request related to en overridden logical storage address for implementing a provisional redundant storage sequence including: storing the data element to which the write command relates within the primary storage space—associated with a first array of VS devices 552, and substantially immediately or concurrently storing recovery-enabling-data corresponding to the data-element within the temporary backup storage space—associated with a second array of VS devices 555. The controller 554 is configured to acknowledge the write request substantially immediately following completion of the storage within the primary storage space and within the temporary backup storage space, and the provisional redundant storage sequence is thus complete. The one or more UPS units 558 are configured to provide backup power to extend data-retention on some or all of the VS devices 552 and 555 in case of power interruption. Asynchronously with the provisional redundant storage sequence, the controller 554 is configured to destage the recovery-enabling-data to the permanent backup storage space—associated with an array of VS devices 556.

In some embodiments, the controller 554 may be configured to manage the asynchronous destaging of the recovery enabling data in accordance with a predefined permanent backup deferral policy which takes into account at least one parameter that is independent of the provisional redundant storage sequence of the respective data element. The deferral policy may provide a controlled timeframe for deferring the asynchronous destaging of the recovery enabling data relative to the storage subsystem's 550 response to the respective write request (the storage system response may be any one of the operations which are part of the provisional redundant storage sequence). The deferral policy may take into account the capacity of the UPS units 558. The deferral policy may further take into account the availability of storage resource within the temporary backup storage space. The deferral policy may take into account at least one other process running within the storage system and competing for resources with the data destaging process.

During normal operation (not power interruption) the UPS units 558 are configured to provide backup power for at least the time-duration required for completing the destaging of data from the substantially temporary backup space (which is based on VS devices 555) to the substantially permanent backup storage layer (which is based on NVS devices 556), so that the entire data-set of the auxiliary storage space is backed up on NVS devices 556 before the storage system can gracefully shutdown.

Further as part of the proposed storage subsystem 550, the controller 554 may be responsive to an indication that the recovery-enabling-data was successfully destaged to the permanent backup storage space for releasing the temporary backup storage space resources—within the second array of VS devices 555, that were used for storing the corresponding recovery-enabling-data. Once released, the storage resources of the temporary backup storage space can be used for storing other data, such as recovery-enabling-data corresponding to a data element that is associated with a more recent write command into the auxiliary storage space.

In some embodiments, the storage capacity of the temporary backup storage space is substantially smaller than the storage capacity of the primary storage space. The storage capacity of the permanent backup storage space is substantially equal to (or larger than) the storage capacity of the primary storage space. At any time during the operation of the proposed storage system, the data stored within the primary storage space is protected by corresponding recovery-enabling-data that is stored within the temporary backup storage space or within the permanent backup storage space. During normal operation (not power interruption), a relatively small portion of the data within the primary storage space is protected by data within the temporary backup storage space, and the permanent backup storage space protects at least the remaining data which is not protected by the data within the temporary backup storage space.

As mentioned above, the controller 554 may be configured to manage the asynchronous destaging of the recovery enabling data in accordance with a predefined permanent backup deferral policy. Further details with respect to the permanent backup deferral policy are now provided.

In some embodiments, the deferral policy may be configured to take into account the capacity or the UPS units 558. The deferral policy may further take into account the availability of storage resources within the temporary backup storage space. In another example, the deferral policy may take into account the existence within the temporary backup storage space of a pending destaging chunk of recovery-enabling data which is sequential according to the map of the permanent backup storage space, and possibly also take into account the size of the sequential chunk. In still further embodiments, the deferral policy may take into account at least one other process running within the storage system.

According to some embodiments, the deferral policy may include a priority rule, function and/or criterion for promoting a pending write command to the permanent backup storage space with time. Thus, all other things being equal, a priority of a pending write command to the permanent backup storage space would increase with time.

For example, in some embodiments, according to the deferral policy, the write command to the NVS array 556 may be deferred following the storage subsystem's 550 response to the corresponding write command, for example, to allow completion of a priority operation or a priority sequence that is concurrently pending or that is concurrently taking place within the storage system 500 or within the storage subsystem 550. According to some embodiments, while the write command to the NVS array 556 is pending, its own priority may be adjusted (promoted) and thus it may itself become a high-priority operation relative to other operations within the mass-storage system 500 or within the storage subsystem 550. In further embodiments, the deferral policy is configured so that any pending write command to the permanent backup storage space would receive high-priority within a controlled timeframe from the storage subsystem's 550 response to corresponding incoming write command. In still further embodiments, the policy may be configured so as to guarantee that the issuance of a write command to the permanent storage space is never deferred beyond a certain period of time. It would be appreciated that other measures may be implemented by the permanent backup policy to control the amount of time a certain write command to the permanent backup storage space is deferred before being issued. In further embodiments, the time duration during which a write request to the permanent backup storage space is pending is not taken into account by the deferral policy and some pending write requests may be deferred for relatively long time duration.

There is now provided a discussion of some examples of possible implementation of a deferral policy which may be implemented by the storage subsystem 550 according to some embodiments of the present invention.

According to some embodiments, the controller 554 (which is, for example, responsible for implementing the deferral policy) may manage a queue (or set of queues) of pending write commands to the permanent backup storage space, and the management of the queue (or set of queues) may be associated with the (current) capacity of the UPS units 558. Various queue management techniques are known per se and may be implemented in some embodiments of the present invention. The deferral policy may control the size of the queues (and their number) and may manage it according to the capacity of the UPS units 558, so that in case of power interruption the backup power is sufficient to destaged the entire queue of pending write commands to the permanent backup storage space and to store the backup data within the nonvolatile media (e.g., array of VS device 556) underlying the permanent backup storage space. The size (and number) of the pending write requests queue(s) is a parameter related to the aggregated footprint of the pending write requests in terms of storage space and/or in terms of the amount of power required in order to complete the destaging of the pending write requests in the queue (or set of queues) and the storage thereof within the permanent backup storage space.

In some embodiments, the deferral policy may include several—progressive thresholds, the progressive thresholds associated with respective progressively increasing queue(s) sizes. In association with each one of the progressive thresholds, the deferral policy may include a priority parameter, so that the larger the size of the queue the higher the priority that is given to pending write requests at the top (or at the bottom or any other location in the queue—depending on the queue management technique) of the queue. The thresholds included in the deferral policy may be used to ensure that the size of the pending write requests queue does not grow beyond that which can be supported by the available backup power. In some embodiments, in case the amount of available backup power changes, the deferral policy is manually or automatically updated accordingly.

In further embodiments, the size of the temporary backup storage space is determined according to the capacity of UPS units 558, or according to the amount of available backup power. For example, the temporary backup storage space is such that the size of the available backup power is sufficient to enable to complete the destaging of the entire temporary backup storage space and to complete storage of data which corresponds to the entire temporary backup storage space within the permanent backup storage space. In such embodiments, the deferral policy may relate to the amount of permanent backup storage space that is used for storing backup data and may promote issuance of write commands to the permanent storage space as temporary backup storage resources are approaching (e.g., to various degrees) depletion.

In still further embodiments, according to the deferral policy, within the queue of pending write commands to the permanent backup storage space, priority is given to pending write commands to the permanent backup storage space which form a chunk of recovery-enabling data which is sequential according to the map of the permanent backup storage space. In further embodiments, the size of the chunk of sequential writes to the permanent backup storage space is also taken into account by the deferral policy. It would be appreciated that sequential writing is generally faster, and in particular writing to a common HDD in sequence is substantially faster than writing to the same HDD out-of sequence.

In still further embodiments, according to the deferral policy, within the queue of pending write commands to the permanent backup storage space, priority is given to write commands which are associated with a data element which was least accessed, e.g., priority is given to destaging recovery enabling data which is associated with a data element which has been accessed the smallest number of times during a certain period of time. In another example, according to the deferral policy, priority is given to write commands which are associated with a data element which was least recently access (the oldest data). Access frequency and/or most recent access times may be used by the deferral policy as indication of likelihood that the data element will be accessed again soon. By anticipating (with at least partial success) rewrites on a certain data element and the resulting updates to the corresponding recovery enabling data within the temporary backup storage space, it may be possible to reduce the number of writes to the permanent backup storage space, and to improve utilization of the temporary backup storage space and overall performance of the storage system.

In a further example of a possible deferral policy, the deferral policy may take into account services or processes within the storage system 500 or within the storage subsystem 550. In some embodiments, the deferral policy may take into account services or processes which compete for system resource (or subsystem) with the destaging process. By way of example, the deferral policy may include a predefined system (or subsystem) optimization criterion. The system optimization criterion may relate to at least one resource of the mass-storage system 500 or to at least one resource of the storage subsystem 550 and may prescribe an optimization scheme, an optimization threshold or an optimization function with respect to the system (or subsystem) resource(s). According to the deferral policy, and based upon the predefined system optimization criterion, the issuance of a write command to the permanent backup storage space may be deferred for a certain period of time from its initiation or following the subsystem's 550 response the corresponding incoming write command.

In some embodiments, the optimization criterion may relate to one or more system parameters which are associated with the current, past, projected or assumed (e.g., based on statistical data) operation of the system 500 (or of the subsystem) or any of its components, performance of the system 500 (or of the subsystem) or any of its components, capacity of the system 500 (or of the subsystem) or any of its components, priority of a process or services running or pending in the system 500 (or in the subsystem), the redundancy of the system 500 (or of the subsystem) or of any of its components. The optimization criterion may also relate to the state of the pending write commands to the permanent storage space, including for example, the number of pending write commands in the queue, the aggregate size of pending write commands in the queue, the average amount or mean pendency time of write commands in the queue, the highest pendency time of write commands in the queue, the lowest pendency time of write commands in the queue, the utilization level of the temporary backup storage space, the current, past or projected incoming I/Os (instantaneous or average) rate, etc. The above parameters are provided by way of example only and are non-limiting. Furthermore, the use of the above parameters is not limited to the system optimization based deferral policy and may be used as part of other implementations of the deferral policy described herein.

The system optimization criterion may allow optimization of the system's 500 or subsystem's 550 resource(s) while maintaining a controlled lag between the storage subsystem's 500 response to the corresponding incoming write command and the issuance of the respective write command to the permanent backup storage space. An example of such an optimization rule may include waiting for the number write commands to the permanent backup storage space to reach a predefined threshold X but wait no longer than a predefined period of time T, since the last response to a write command corresponding to any of the pending write commands to the permanent backup storage space and/or since the initiation of any of the pending write commands.

Having described various possible implementations of the deferral policy there is now described an alternative implementation of the storage subsystem 550. According to some embodiments, the NVS devices 556 may be omitted from the auxiliary storage subsystem 550, and instead, the controller 554 may be configured to destage the recovery-enabling data associated with data written into the primary storage space of the auxiliary storage space to the respective physical storage resource associated with the corresponding overridden logical storage addresses within the main storage space. For example, the controller 554 may be configured to allocate the permanent backup storage space over physical storage resource provided by certain ones of the NSSDs 32A-32M. In particular, the controller 554 may be configured to allocate the permanent backup storage space over physical storage resources associated with the corresponding overridden logical storage addresses within the main storage space.

Further by way of example, the controller 554 may be configured to store a copy of the updated data that was stored within the primary storage space of the auxiliary storage subsystem 550, possibly in cooperation with the NSSDs controller 34, within certain ones of the NSSDs 32A-32M, e.g., within the respective physical storage resources associated with the corresponding overridden logical storage addresses.

In some embodiments, the controller 554 may implement the permanent backup deferral policy described above to control the writing of backup data into the NSSDs 32A-32M underlying the permanent backup storage space. According to some embodiments, the controller 554 may be configured to keep track of which data within the auxiliary storage space was updated (or not) within the main storage space (i.e., within the NSSDs 32A-32M), and the snapshot procedure described above may be implemented only with respect to logical storage addresses whose content was updated while being overridden, but the updated data was not yet destaged, as part of the destaging process, to the main storage space. According to some embodiments, the permanent backup deferral policy may be used as the updated routine described below.

In a further embodiments of the present invention, during normal operation, the controller 554 may be configured to destage data for permanent backup to certain members of the NSSDs 32A-32M, in particular, to the physical storage resources associated with the corresponding overridden logical storage addresses within the main storage space. However, under certain circumstances, the controller 554 may be adapted to destage data for permanent backup to NVS devices 556 which are part of the auxiliary storage subsystem 550. For example, in case of a shutdown mode initiated with respect to auxiliary storage subsystem 550, for example as a result of a power interruption, the controller 554 may stop destaging of data to the NSSDs 32A-32M, and instead may destage all remaining data to the NVS devices 556 which are part of the auxiliary storage subsystem 550. When normal operating conditions are restored (e.g., normal power conditions are restored), the data may be restored to the VS devices 552 associated with the primary storage space of the auxiliary storage subsystem 550.

According to still further embodiments of the invention, the destaging of data for permanent backup is always performed vis-à-vis the NVS devices 556 which are part of the auxiliary storage subsystem 550, and as a further process involving the auxiliary storage subsystem 550, data which is updated within the primary storage space of the auxiliary storage subsystem 550 is updated within certain members of the NSSDs 32A-32M, e.g., within the respective physical storage resources associated with the logical storage addresses whose content was updated while being overridden. The destaging process and the update process may be asynchronous. The destaging process and the update process may be independent. The update process is further described hereinbelow.

It would be appreciated that while the data associated a certain overridden logical area is within the auxiliary storage space it may change, for example, as a result of I/O operations. In some embodiments, in order to accommodate for the updated data, as part of the mapping reinstatement process, additional physical storage resource within the main storage space may be allocated to the overridden logical storage area. It is also possible that physical storage resource within the main storage space may be released and unallocated to the overridden logical storage area, as necessary. In some embodiments, this feature is particularly appropriate when a thin provisioning configuration is used for allocated physical storage resource to the logical storage space.

Having described certain embodiments of the invention which relate to the auxiliary storage subsystem and the management thereof, a description of certain embodiments of the invention which relate to the update routine shall now be provided. Reference is resumed to FIGS. 1 and 2. As mentioned above, the storage controller 10 may implement one of several routines for updating overridden physical storage locations in connection with a certain data update that was implemented on the respective overriding physical storage locations within the auxiliary storage space. According to one routine, updates implemented on an overriding physical storage location are implemented as soon as the relevant storage devices 32A-32M associated with the main storage space and/or other resource of the storage system 100 are available to execute the operations required for implementing the update within the main storage space.

In according with another implementation of the update routine, updates are deferred until a certain criterion is met or as long as a certain criterion is met. The deferral policy of the update routine may correspond to the permanent backup deferral policy described above.

According to implementation of the update routine, updates implemented on an overriding physical storage location are not implemented on the respective overridden physical storage location within the main storage space while the mapping of the respective logical storage address(es) are overridden. The updates are only implemented when the mapping of the respective logical storage address(es) are reinstated, as part of the snapshot operation.

It would be appreciated, that in some embodiments, the storage controller 10 may switch among the different routines, either in response to some criterion, rule or condition or in response to a manual instruction from an administrator.

Resuming description of the flow chart shown in FIG. 3, the storage controller may be further responsive to a second condition. In FIG. 3, and in accordance with some embodiments, the storage controller 10 periodically checks for circumstances which meet the second condition (blocks 370 and 375). The storage controller 10 may be responsive to the second condition being met for loading a snapshot of the data currently stored in the overriding physical storage locations into the overridden physical storage locations (block 380), and for reinstating the mapping of the logical storage addresses to the overridden physical storage locations (block 390). The second condition is also referred to herein as the mapping-reinstatement condition and it may be used for invoking the snapshot and the mapping reinstatement operations described herein.

In some embodiments, once the mapping of the logical storage area to the physical storage locations in the main storage space is reinstated, the storage controller 10 may address I/O requests which reference a logical storage address within the logical storage area to the respective physical storage location in the main storage space (block 395).

In some embodiments, the first condition and the second condition are related to one another and together give rise to a substantially temporary framework for the mapping override operation with respect to any group of physical storage locations in the main storage space 130 subjected to the override operation. The duration of the mapping override operation with respect to any group of physical storage locations in the main storage space 130 is the duration in-between a mapping override (block 340) and a reinstating of the mapping (block 390) with respect to that group of physical storage locations in the main storage space 130. According to a further perspective and in further embodiments, the duration of the mapping override may be regarded as the duration between the end of the mapping override operation and the copying of the data associated with the overridden logical storage area into the auxiliary subsystem (block 360) and the reinstating of the mapping (block 390).

According to some embodiments, there is a temporal relation between the first condition and the second condition, whereby the mapping reinstation is initiated within a control period of time from the initiation of the mapping override. In further embodiments, the mapping reinstation is initiated within a predefined period of time from the initiation of the mapping override. In yet further embodiments, based on the first condition, a first time instance is determined for initiating the mapping override, and based on the second condition, a second time instance is determined for initiating the mapping reinstation, and thus the first and second conditions give rise to a substantially temporary time framework for the mapping override operation.

By way of example, database of a TelCo company may be stored within the company's mass storage system. At the end of the month the company generates bills for its clients. According to a first condition implemented by the system storage controller the mapping of the logical storage area associated with the database is overridden at the end of the month (the first condition) and the logical storage area associated with the database is mapped to respective physical storage locations within the high-performance auxiliary storage subsystem. The mapping override operation would enable high performance processing of the billing data and generation of the bills. At the beginning of the month (the second condition) a snapshot with any data updates and/or new data associated with the logical storage addresses whose mapping was overridden is updated on the overridden physical storage locations and the mapping of the logical storage addresses to the physical storage locations in the main storage subsystem is reinstated.

According to further embodiments, the relation between the first and second conditions may be associated with a predefined performance parameter. For example, in accordance with the first condition, the mapping override is initiated when a performance indicator associated with certain logical storage addresses within the logical storage spaces meets a first performance related criterion (e.g., crosses or drops below a certain threshold), and in accordance with the second condition, the mapping reinstation is initiated when a performance indicator associated with the logical storage addresses, whose mapping was overridden, meets a second performance related criterion.

For example, in accordance with a first condition, the storage controller 10 is configured to initiate a mapping override operation in respect of a certain logical storage area when the average I/O rate measured over a predefined duration exceeds a predefined threshold. Further by way of example, in accordance with a second condition, the storage controller 10 is configured to initiate a mapping reinstatement operation in respect of a certain logical storage area whose mapping to physical storage locations in the main storage subsystem is currently overridden when the average I/O rate measured over a predefined duration falls below a predefined threshold. The use of an average measure over a certain period of time, may prevent inefficient frequent and unjustified triggering of override and reinstatement operation as a result of transitional spikes.

According to further embodiments, the storage controller 10 may be adapted to determine on which logical storage addresses or on which group of logical storage addresses to implement the overriding operations. In further embodiments, at least the first condition may be configured to indicate which logical storage addresses or which logical storage area within the logical storage space should be overridden. In some embodiments, the first condition may set forth explicitly a list of logical storage addresses or designate an area within the logical storage space whose mapping to physical storage addresses in the main storage space 130 should be overridden under certain circumstances. In other embodiments, the first condition may set forth an override test, and the storage controller 10 may determine when to initiate the override test and which logical storage addresses or which logical storage area failed (or passed) the test and accordingly which logical storage addresses or which logical storage area should be subject to the dynamic mapping override operation. In one example, the override test may be related to an average I/O rate measured over a predefined duration. In other embodiments a similar reinstatement test may be implemented with respect to the overridden logical storage area.

In some embodiments, the override test implemented by the storage controller 10 may be adapted to identify, at each iteration of the test, an area of the logical storage space that should be overridden. An area of the logical storage space comprises a group of logical storage locations which are operatively related to one another. In one embodiment, an area of the logical storage space may be associated with physical storage addresses which are commonly accessed together. For example, an area of a logical space may include the logical storage addresses related to a certain department of the company associated with the mass storage system 100 (e.g., the finance department).

The override test may include various statistical and other evaluation mechanisms, including performance related and time related mechanisms, which may be utilized to determine the mapping of which logical storage area is to be overridden (or remain overridden) and the mapping of which logical storage area is to be reinstated (or not be overridden). It would be appreciated that the mapping of an overridden logical storage area may be reinstated in accordance with some predefined condition, and the override test may relate only to the initiation of an override operation.

In some embodiments, when determining which logical storage area within the logical storage space should be overridden, or when determining when to initiate the override operation, the storage controller 10 may be configured to take into account data with respect to the volume or the extent of the storage resources provided by the auxiliary storage space 150. In further embodiments, data with respect to the volume or the extent of the storage resources provided by the auxiliary storage space 150 may possibly relate to the availability of storage resources within the auxiliary storage space 150. As mentioned above, in some embodiments, the size of the auxiliary storage space 150 corresponds to a portion of the size of the main storage space 130. As was also mentioned above, according to some embodiments, the auxiliary storage subsystem 50 is capable of providing substantially higher performance in read operations, in write operations or in both read and write operations compared to the main storage subsystem 30. Thus, the mapping override procedure may boost the performance on an overridden logical storage area.

In some embodiments, the override test may include optimization criteria. The optimization criteria may be used to calculate an optimized utilization of the auxiliary storage system 50. More particularly, the optimization criteria may be used to determine the optimal allocation of the physical storage locations in the auxiliary storage space 150 at any given instant and/or under a given set of circumstances, such as operation parameters of the mass storage system 100. For example, the storage controller 10 may utilize the override test and the optimization criteria embedded within the test to determine, based on performance parameters which are available to the storage controller 10, the mapping of which logical storage area(s) is to be overridden (or remain overridden) and the mapping of which logical storage area is to be reinstated (or not be overridden), taking into account, for example, the total performance gain and the total performance cost of an override or reinstatement operation on each of the candidate logical storage areas.

According to some embodiments of the invention, as part of the override operation on any given logical storage area, the storage controller 10 may also be adapted to determine for each logical storage address that is to be overridden, which one or more physical storage locations in the auxiliary storage space are to be mapped to that logical storage area. The storage controller 10 may utilize any known in the present or yet to be devised provisioning technique to determine which physical storage location(s) in the auxiliary storage space to map to a logical storage area whose mapping is overridden, taken into account the requirements of the override procedure, such as the amount of storage resources that are to be subject to the override operation.

Having discussed various aspects of embodiments of the invention, and before continuing with a discussion of still further aspects, there is now provided a discussion of some of the benefits which may be associated with certain embodiments of the proposed invention. The following discussion is provided by way of example only and does not limit the scope of the invention.

Some embodiments of the invention propose to combine within a mass storage system a large-volume storage subsystem that is typically characterized by low purchasing cost (the main storage subsystem) and a smaller volume storage subsystem that is typically characterized by relatively high purchasing cost but which is typically also capable of significantly higher performance in read operations, in write operations or in both read and write operations. Also proposed is a management scheme for a mass storage system wherein the mapping of a logical storage area (or of a plurality of logical storage addresses) to storage resource within the main storage subsystem can be overridden with a mapping of the logical storage area to storage resource in the auxiliary storage space, for example, for purpose of temporarily boosting performance on the logical storage area whose mapping is overridden. The proposed override operation enables seamless migration (of the relevant logical storage area) from storage in the main storage subsystem to storage in the auxiliary storage subsystem. In case the auxiliary storage subsystem is a better performer compared to the main storage subsystem, as is proposed according to some embodiments of this invention, the migration can help to improve overall performance of the mass storage system, in particular with respect to the logical storage area which is migrated to the auxiliary storage subsystem.

It would be appreciated by those versed in the art, that the proposed mapping override procedure is significantly different than using a high performance cache. The overriding physical storage addresses in the auxiliary storage space provide a storage service which is not the same as a caching service. As long as the mapping for a certain logical storage area is overridden, the overriding physical storage locations are responsible for and are adapted to persistently store the data associated with the respective logical storage area whose mapping is overridden. Furthermore, as long as the physical storage locations within the auxiliary storage space are mapped to a logical storage area, the physical storage locations are exclusively allocated to that logical storage area and cannot be accessed or used in connection with any other logical storage addresses. Still further, in some embodiments, a redundant and/or stripped storage scheme may be implemented over the auxiliary storage subsystem or with respect to some portion of the auxiliary storage subsystem, such as various levels of RAID. Redundant and/or stripped storage is one example of a feature that is commonly regarded as being applicable to storage resources.

Furthermore, the reversibility of the mapping override procedure, which is proposed by some embodiments of the invention, may also be advantageous under certain circumstances since it enables a dynamic allocation of the higher performing auxiliary storage space, as needed. This means that the different areas of the logical storage space can receive a performance boost if and when it is most needed, and when other areas have a stronger need for boosting, the auxiliary storage space (or some portion thereof) can be made available for and may be allocated to those areas.

Having described in detail certain embodiments of a mass storage system in accordance with some embodiments of the invention, there is now described a further aspect of the invention which relates to a storage controller that may be implemented as part of a mass storage system. According to some embodiments, the proposed storage controller is adapted to control various aspects of the mass storage system's operation. The operation of the storage controller was described previously as part of the description of the mass storage system. The following discussion augments the description provided above.

As mentioned above, the storage controller may be adapted to control the operation of some of the internal components of the mass storage system. The storage controller may also be operatively connected to a plurality of hosts that are associated with the mass storage system. The storage controller may facilitate service of I/O requests directed by the plurality of hosts to the mass storage system.

Figure 4:
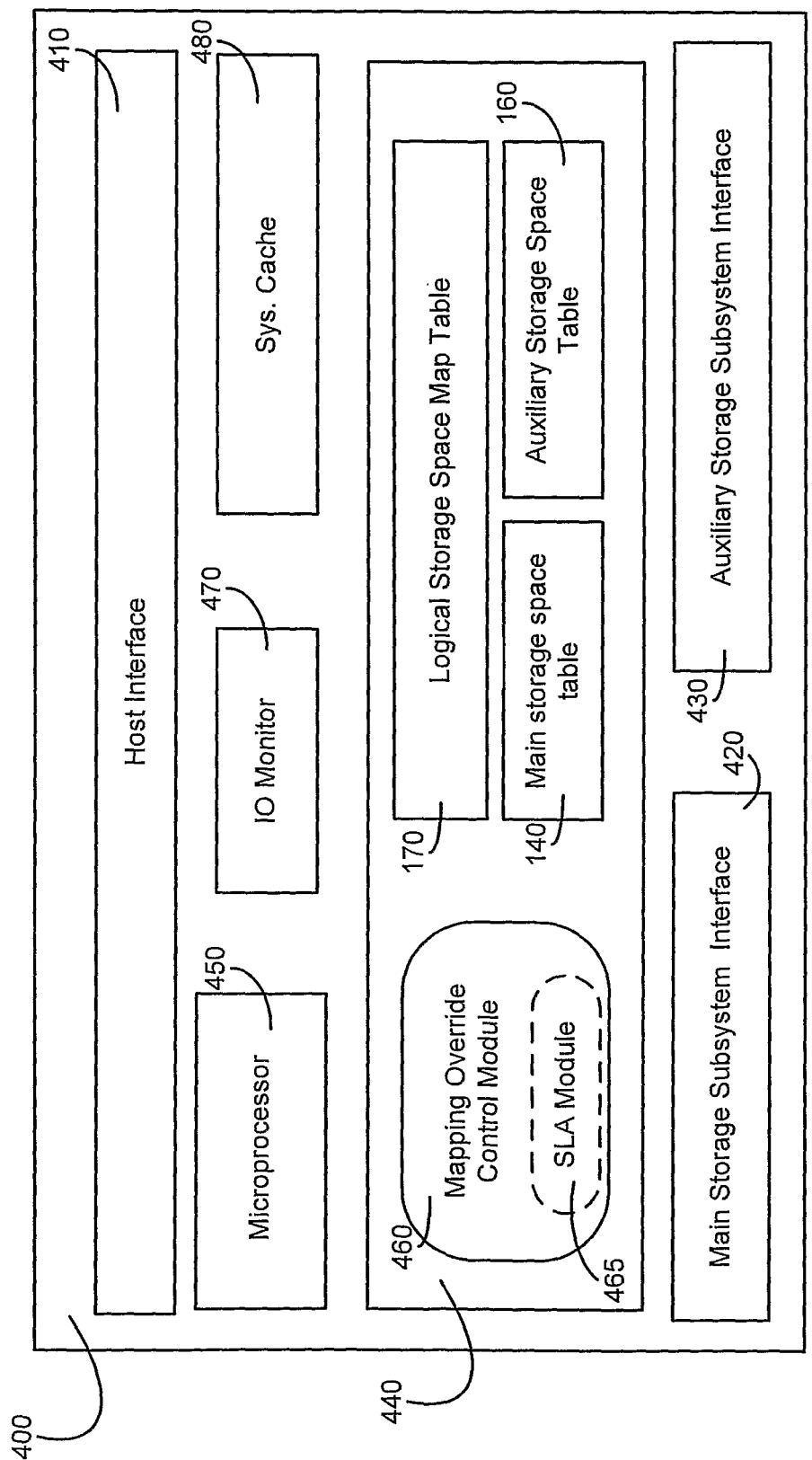
FIG. 4 is a block diagram providing an expanded view of a storage controller, according to some embodiments of the invention.

Reference is now made to FIG. 4, which is a block diagram providing an expanded view of a storage controller, according to some embodiments of the invention. The storage controller 400 may include a host interface 410. The storage controller 400 may be connected to each one of a plurality of hosts through the host interface 410. The storage controller 400 may be connected to the main storage subsystem through a main storage subsystem interface 420, and to the auxiliary storage subsystem through an auxiliary storage subsystem interface 430. Any suitable interface for connecting a storage system to hosts and for connecting a storage controller to the main storage subsystem and to the auxiliary storage subsystem may be used as part of some embodiments of the invention. For example, a Fiber Channel network storage protocol may be implemented in between the plurality of hosts and the storage controller 400. In this example, the host interface 410 may be a Fiber Channel interface.

According to some embodiments, the storage controller may include a data retention unit 440. In some embodiments, the storage controller 400 may use the data retention unit 440 to store any data which is required by the storage controller 400 for managing the operation of the mass storage system and/or of any of its components. In some embodiments the storage controller 400 may utilize the data retention unit 440 to store data with respect to each one of the logical storage space, the main storage space and the auxiliary storage space. For example, the storage controller 400 may store within the data retention unit 440 a copy of each one of the following: the main storage space table 140, the auxiliary storage space table 160, and the logical storage space table 170 shown in FIG. 2.

The storage controller 400 may include a microprocessor 450. The microprocessor 450 may be adapted to process data received from the various components of the storage controller 400 and to provide processed data outputs.

The storage controller 400 may include a mapping override control module 460. The mapping override control module 460 may be adapted to manage the mapping override mechanism, possibly in cooperation with the microprocessor 450. In some embodiments, the mapping override control module 460 may at least provide and manage the framework of the override mechanism that was described above. In some embodiments, the override control module 460 may include at least a predefined condition, rule or criterion (a "first condition" or a "dynamic mapping override condition") for triggering a mapping override operation with respect to a mapping of a certain area of the logical storage space. In further embodiments, the override control module 460 may include a predefined condition, rule or criterion (a "second condition" or a "mapping-reinstatement condition") for triggering a mapping reinstatement operation in respect of an area of the logical storage space whose mapping is currently overridden. In still further embodiments, the override control module 460 may include a condition, rule or criterion for designating an area of the logical storage space for being subjected to the mapping override operation. In still further embodiments, the override control module 460 may designate, for each mapping override operation, the physical storage locations within the auxiliary storage space that are to be allocated to the logical storage area whose mapping is to be overridden.

In some embodiments, the mapping override control module 460 may include a Service Level Agreement ("SLA") module 465. The SLA module 465 may set forth explicitly or implicitly the framework of the override mechanism that was described above. In one example, the SLA module 465 may assign service level parameters to each one of a plurality of predefined areas within the logical storage space. Further by way of example, the override control module 460 may obtain operational parameters of the mass storage system, for example, from an I/O monitor 470. Still further by way of example, the SLA module 465 may process the operational parameters of the mass storage system, possibly by utilizing the microprocessor 450, to determine whether the service level for any of the predefined areas within the logical storage space is not in compliance or is approaching a non-compliant state compared with the service level assigned to that logical storage space area. In response to detecting non-compliance or approaching non-compliance with the SLA for a given logical storage space area, and providing that there are sufficient physical storage locations within the auxiliary storage space available, the SLA module 465 may initiate an override operation with respect to the logical storage space area. In some embodiments, in case the extent of available physical storage locations within the auxiliary storage space is not sufficient for supporting a mapping override operation on a predefined logical storage area for which the service level is not in compliance with the SLA, the SLA module 465 may initiate a mapping reinstatement operation for a different area of the logical storage space whose mapping is currently overridden, to thereby release physical storage locations within the auxiliary storage space, and thereby enable the mapping override operation in respect of a predefined logical storage area for which the service level is not in compliance with the SLA. In some embodiments, the SLA module 465 may initiate the mapping reinstatement operation in respect of a logical storage area for which the service level is closest to being compliant with the SLA or exceeds the requirements of the SLA.

In some embodiments, in addition to the SLA assigned to each predefined area of the logical storage space, the SLA module 465 may assign a priority parameter for each predefined area of the logical storage space. In some embodiments, the SLA module 465 may be configured to detect that two areas within the logical storage space are competing candidates for a mapping override operation, including when, among the competing candidates, there is an area for which the mapping is currently overridden and an area for which the mapping is not overridden. In some embodiments, the SLA module 465 may determine the priority among the competing candidates for the mapping override operation in accordance with the priority parameter associated with each one of the competing areas of the logical storage space, and if necessary reinstate the mapping of the currently overridden area and override the other area of the logical storage space.

In some embodiments, and as is shown for example in FIG. 4, the storage controller 400 may include a cache module 480. The implementation and use of cache modules in mass storage systems is generally well-known. In some embodiments, the cache module 480 provides a temporary storage space. The temporary storage space within the cache module 480 is typically used for temporarily retaining frequently accessed data. The cache module 480 may be capable of offering rapid access to the data stored therein compared to the main storage subsystem.

In some embodiments, the storage controller 400 may be adapted to disable cache services for logical storage addresses whose mapping is currently overridden. In further embodiments, whenever an I/O request is received at the mass storage system, the storage controllers determines whether this request is associated with a logical storage address whose mapping is overridden or not. In case it is determined that the mapping of the logical storage address with which the incoming I/O request is associated is overridden, the storage controller 400 may bypass any caching services otherwise implemented by the storage controller 400 for at least the part of the I/O request which is associated with the logical storage address whose mapping is overridden.

While certain features of the invention have been illustrated and described herein, many modifications, substitutions, changes, and equivalents will occur to those skilled in the art. It is therefore to be understood that the appended claims are intended to cover all such modifications and changes as fall within the true scope of the invention.

The invention claimed is:

1. A mass storage system, comprising:
 a main storage subsystem providing a main physical storage space of the mass storage system and comprising a plurality of non-solid-state storage devices ("NSSDs") allocating a plurality of physical storage locations to the main storage space, the plurality of physical storage locations provided by the NSSDs are mapped to a respective plurality of logical storage addresses; and
 an auxiliary storage subsystem comprising a plurality of solid-state data retention devices ("SSDRDs") providing a plurality of physical storage locations collectively giving rise to an auxiliary storage space;
 a storage system controller coupled to the main storage space and to the auxiliary storage subsystem and is:
  responsive to a first condition for overriding a mapping of a plurality of logical addresses within the main storage space to a respective plurality of physical storage locations with a mapping of the plurality of logical storage address to a respective plurality of physical storage locations within the auxiliary storage space, giving rise to overriding and overridden physical storage locations, and for loading into the overriding physical storage locations a snapshot of the data currently stored in the overridden physical storage locations, and
  is further responsive to a second condition, for loading a snapshot of the data currently stored in the overriding physical storage locations into the overridden physical storage locations, and for reinstating the mapping of the logical storage area to the overridden physical storage locations.

2. The system according to claim 1, wherein the mapping of the plurality of logical storage addresses to a respective plurality of physical storage locations within the main storage subsystem is maintained while the mapping is overridden.

3. The system according to claim 2, wherein while the mapping of the plurality of logical storage addresses to a respective plurality of physical storage locations within the main storage subsystem is overridden, the storage system controller is configured to access the overridden physical storage locations within the main storage subsystem in connection with an I/O request that is associated with associated with a logical storage address among the plurality of logical storage addresses whose mapping is overridden.

4. The system according to claim 3, wherein while the mapping of a logical storage address to one or more physical storage locations within the main storage space is overridden, the storage system controller is configured to update the respective overridden storage location(s) in the main storage space according to changes in the data stored within the respective overriding physical storage location(s) in the auxiliary storage space.

5. The system according to claim 4, wherein the updates of the overridden physical storage location(s) in the main storage space are asynchronous with the changes in the data stored within the respective overriding physical storage location(s) in the auxiliary storage space.

6. The system according to claim 1, wherein the auxiliary storage subsystem is capable of significantly higher performance compared to main storage subsystem.

7. The system according to claim 4, wherein the storage system controller manages a queue of logical storage addresses for which there are pending updates of overridden physical storage locations.

8. The system according to claim 7, wherein the storage system controller is responsive to a state of the queue for adjusting an operation of the mass storage system which is related to the state of the queue.

9. The system according to claim 8, wherein the storage system controller is responsive to a state of the queue for slowing down or temporarily freezing servicing of I/O requests.

10. The system according to claim 7, wherein the storage system controller is further responsive to a limit parameter of a component of the mass storage system that is related to the state of the queue for adjusting an operation of the mass storage system which is related to the state of the queue.

11. The system according to claim 10, wherein the component of the mass storage system whose limit parameter is related to the state of the queue is an uninterrupted power supply unit.

12. The system according to claim 1, wherein there is a temporal relation between the first and the second condition.

13. The system according to claim 12, wherein in accordance with the temporal relation, the mapping reinstation with respect to a logical storage address is initiated within a limited and predefined period of time from the initiation of the mapping override with respect to the logical storage address.

14. The system according to claim 1, wherein the relation between the first condition and the second condition is associated with a predefined performance parameter.

15. The system according to claim 14, wherein in accordance with the first condition, the mapping override is initiated when a performance indicator associated with plurality of logical storage addresses meets a first performance related criterion, and wherein in accordance with the second condition, the mapping reinstation is initiated when a performance indicator associated with the plurality logical storage addresses whose mapping was overridden meets a second performance related criterion.

16. The system according to claim 1, wherein the storage system controller is adapted to allocate the logical storage space based on a plurality of physical storage locations provided by the plurality of NSSDs.

17. The system according to claim 16, wherein the storage system controller is configured to ignore the plurality of physical storage locations within the auxiliary storage space when allocating the logical storage space.

18. The system according to claim 1, wherein the plurality of NSSDs in the main storage subsystem are selected from a group consisting of: hard disk drive, hybrid hard drive, holographic data storage, tape drive, optical disk, Compact Disk, Digital Versatile Disc, Bluray disc and floppy Disk, microelectro-mechanical-system ("MEMS") based storage unit.

19. The system according to claim 1, wherein one or more of the plurality of SSDRDs comprises one or more volatile data retention units.

20. The system according to claim 1, wherein the plurality of SSDRDs in the auxiliary storage subsystem are selected from a group consisting of: DRAM based SSD, NAND based Flash SSD including MLC or SLC versions random-access memory ("RAM"), dynamic random-access memory ("DRAM"), static random-access memory ("SRAM"), Extended Data Out DRAM ("EDO DRAM") and Fast Page Mode DRAM.

21. The system according to claim 1, wherein the storage system controller comprises:
a main storage space table including an entry for each physical storage location in the main storage space;
an auxiliary storage space table including an entry for each physical storage location in the auxiliary storage space; and
a logical storage space table including an entry for each logical storage address in the main storage space, and including for each logical storage address entry a record of one or more physical storage locations in the main storage space which are allocated to that logical storage address.

22. The system according to claim 21, wherein the logical storage space table further includes, at least for each logical storage address whose mapping to the respective one or more physical storage locations in the main storage space is currently overridden, a mapping override flag which indicating the override of the mapping of the corresponding logical storage address.

23. The system according to claim 22, wherein the logical storage space table further includes, at least for each logical storage address whose mapping to the respective one or more physical storage locations in the main storage space is currently overridden, a record of one or more overriding physical storage location in the auxiliary storage space.

24. The system according to claim 1, wherein the size of the auxiliary storage space corresponds to a portion of the main storage space.

25. The system according to claim 1, wherein the main storage subsystem comprises an intermediate storage controller, the intermediate storage controller is operatively coupled to the plurality of NSSDs and is adapted to allocate a plurality of virtual physical storage locations, each one of the plurality of virtual physical storage locations corresponding to one or more physical storage locations provided by the plurality of NSSDs, and wherein the intermediate storage controller is operatively connected to the storage system controller and is adapted to provision the plurality of virtual physical storage locations to the storage system controller.

26. The system according to claim 25, wherein the storage system controller is configured to manage a virtual storage address substantially as if it where a physical storage address.

27. The system according to claim 26, wherein the storage system controller is adapted to direct an I/O request referencing a virtual storage address to the intermediate storage controller associated with that virtual storage address.

28. The system according to claim 1, wherein the storage system controller is adapted to implement the mapping override operation on one of a plurality of predefined groups of logical storage addresses.

29. A mass storage system, comprising:
a main storage subsystem providing a main physical storage space of the mass storage system and comprising a plurality of NSSDs, the plurality of NSSDs providing a plurality of physical storage locations and the main storage space comprising the plurality of physical storage locations provided by the plurality of NSSDs;
a storage system controller coupled to the main storage subsystem and is configured for mapping a plurality of logical storage addresses to a respective plurality of physical storage locations within the main storage space, giving rise to a logical storage space; and
an auxiliary storage subsystem comprising a plurality of solid-state data retention devices SSDRDs capable of substantially permanently storing data thereon, the plurality SSDRDs providing a plurality of physical storage locations collectively giving rise to an auxiliary storage space,
wherein the storage system controller is coupled to the auxiliary storage subsystem and is:
responsive to a first condition for overriding a mapping of a logical storage area within the logical storage space to a plurality of physical storage locations within the main storage subsystem with a mapping of the logical storage area to a plurality of physical storage locations within the auxiliary storage space, giving rise to overriding and overridden physical storage locations, and for loading into the overriding physical storage locations a snapshot of the data currently stored in the overridden physical storage locations, and
is further responsive to a second condition, for loading a snapshot of the data currently stored in the overriding physical storage locations into the overridden physical storage locations, and for reinstating the mapping of the logical storage area to the overridden physical storage locations.

30. A mass storage system, comprising:

a main storage space associated with a first plurality of storage devices characterized by relatively large storage volume, relatively low purchasing cost and relatively low performance, the main storage space comprising a plurality of physical storage locations provided by the first plurality of storage devices which are mapped to a plurality of logical storage addresses;

an auxiliary storage space associated with a second plurality of storage devices characterized by relatively small storage volume, relatively high purchasing cost and relatively high performance, the auxiliary storage space comprising a plurality of physical storage locations provided by the second plurality of storage devices;

a storage system controller coupled to the main storage space and to the auxiliary storage space and is responsive to a first condition for overriding a mapping of a plurality of logical addresses to a respective plurality of physical storage locations provided by the first plurality of storage devices with a mapping of the plurality of logical storage address to a respective plurality of physical storage locations within the auxiliary storage space, giving rise to overriding and overridden physical storage locations, and for loading into the overriding physical storage locations a snapshot of the data currently stored in the overridden physical storage locations, and is further responsive to a second condition, for loading a snapshot of the data currently stored in the overriding physical storage locations into the overridden physical storage locations, and for reinstating the mapping of the logical storage area to the overridden physical storage locations.

* * * * *